US012298194B1

(12) United States Patent
Sylvester et al.

(10) Patent No.: US 12,298,194 B1
(45) Date of Patent: May 13, 2025

(54) SENSOR DEPLOYMENT FOR MODULAR PAVEMENT SLABS

(71) Applicant: Integrated Roadways, LLC, Chicago, IL (US)

(72) Inventors: Tim Sylvester, Raytown, MO (US); Mustafa Tekinay, Overland Park, KS (US)

(73) Assignee: INTEGRATED ROADWAYS, INC., Kansas City, MO (US)

(*) Notice: Subject to any disclaimer, the term of this patent is extended or adjusted under 35 U.S.C. 154(b) by 0 days.

(21) Appl. No.: 18/049,044

(22) Filed: Oct. 24, 2022

Related U.S. Application Data

(63) Continuation of application No. 18/048,886, filed on Oct. 24, 2022, which is a continuation-in-part of
(Continued)

(51) Int. Cl.
| | |
|---|---|
| G01L 1/24 | (2006.01) |
| E01C 5/00 | (2006.01) |
| E01C 11/00 | (2006.01) |
| E01C 11/16 | (2006.01) |
| G01G 19/03 | (2006.01) |
| G01K 11/3206 | (2021.01) |

(52) U.S. Cl.
CPC ............... *G01L 1/246* (2013.01); *E01C 5/00* (2013.01); *E01C 11/00* (2013.01); *E01C 11/16* (2013.01); *G01G 19/03* (2013.01); *G01K 11/3206* (2013.01); *E01C 2201/20* (2013.01)

(58) Field of Classification Search
CPC . G01L 1/246; E01C 5/00; E01C 11/00; E01C 11/16; E01C 2201/20; G01G 19/03; G01K 11/3206

USPC .......................................................... 404/45
See application file for complete search history.

(56) References Cited

U.S. PATENT DOCUMENTS

| | | | | | |
|---|---|---|---|---|---|
| 5,801,647 | A | * | 9/1998 | Survo | ................... G08B 19/02 340/580 |
| 8,919,057 | B1 | * | 12/2014 | Dupray | ..................... E04B 5/36 52/223.6 |

(Continued)

FOREIGN PATENT DOCUMENTS

JP          3605139 B2  * 12/2004

OTHER PUBLICATIONS

Google Fiber's Biggest Failure: ISP will turn service off in Louisville article https://arstechnica.com/information-technology/2019/02/google-fiber-exits-louisville-after-.(Feb. 8, 2019).

(Continued)

*Primary Examiner* — Jonathan M Dunlap
(74) *Attorney, Agent, or Firm* — Thompson Coburn LLP

(57) ABSTRACT

A pavement system includes a slab having a body comprising pavement materials presenting a top surface. The system includes a reinforcement layer comprising geogrid materials embedded in the body, strain sensors fixed to the reinforcement layer, and a processor configured to collect multiple electrical signals across time from each of the strain sensors and to analyze the electrical signals to determine one or more of: (A) risk of a structural defect in the slab, (B) risk of a problem with underlying sub-grade beneath the slab, and (C) movement of passing objects across the top surface.

18 Claims, 16 Drawing Sheets

Related U.S. Application Data application No. 17/851,163, filed on Jun. 28, 2022, now Pat. No. 12,054,891, which is a continuation of application No. 17/471,470, filed on Sep. 10, 2021, now Pat. No. 12,000,095, which is a continuation-in-part of application No. 17/226,159, filed on Apr. 9, 2021, now Pat. No. 11,692,315, which is a continuation of application No. 16/528,024, filed on Jul. 31, 2019, now Pat. No. 10,995,457, which is a continuation of application No. 15/889,718, filed on Feb. 6, 2018, now Pat. No. 10,407,838.

(60) Provisional application No. 62/594,822, filed on Dec. 5, 2017, provisional application No. 62/455,287, filed on Feb. 6, 2017, provisional application No. 63/076,767, filed on Sep. 10, 2020.

(56) References Cited

U.S. PATENT DOCUMENTS

| | | | |
|---|---|---|---|
| 2003/0219059 A1* | 11/2003 | Scott | G01N 25/72 374/5 |
| 2009/0024336 A1* | 1/2009 | Tatom | G01G 23/3728 702/56 |
| 2009/0142144 A1* | 6/2009 | Erez | E02D 17/20 405/284 |
| 2010/0126281 A1* | 5/2010 | Cosentino | B64C 3/48 73/802 |
| 2013/0271014 A1* | 10/2013 | Dasaratha | H05B 45/12 362/555 |
| 2016/0084733 A1* | 3/2016 | Wu | G01M 11/083 29/458 |
| 2016/0230353 A1* | 8/2016 | Halahmi | E01C 3/003 |
| 2017/0306577 A1* | 10/2017 | Trifan | F21S 8/032 |
| 2021/0222375 A1* | 7/2021 | Sylvester | E01C 11/00 |
| 2023/0253637 A1* | 8/2023 | Gao | H10N 30/875 429/129 |
| 2023/0254243 A1* | 8/2023 | Vysotsky | H04L 67/141 370/389 |

OTHER PUBLICATIONS

Bao, Tengfei, et al. "Generalized method and monitoring technique for shear-strain-based bridge weigh-in-motion." Journal of Bridge Engineering 21.1 (2016): 04015029.
X. Bao and L. Chen, "Recent progress in distributed fiber optic sensors," sensors, vol. 12, No. 7, pp. 8601-8639, 2012.
Alamandala, Sravanthi, et al. "FBG sensing system to study the bridge weigh-in-motion for measuring the vehicle parameters." 2018 3rd International Conference on Microwave and Photonics (ICMAP). IEEE, 2018.
Bao, Yi, et al. "Temperature measurement and damage detection in concrete beams exposed to fire using PPP-BOTDA based fiber optic sensors." Smart materials and structures 26.10 (2017): 105034.
Batenko, Anatoly, et al. "Weight-in-motion (WIM) measurements by fiber optic sensor: problems and solutions." Transport and Telecommunication 12.4 (2011): 27-33.
Bhatia, Vikram. "Applications of long-period gratings to single and multi-parameter sensing." Optics express 4.11 (1999): 457-466.
Campanella, Carlo Edoardo, et al. "Fibre Bragg grating based strain sensors: review of technology and applications." Sensors 18.9 (2018): 3115.
Chen, Shi-Zhi, et al. "Development of a bridge weigh-in-motion system based on long-gauge fiber Bragg grating sensors." Journal of Bridge Engineering 23.9 (2018): 04018063.
Fajkus, Marcel, et al. "PDMS-FBG-Based Fiber Optic System for Traffic Monitoring in Urban Areas." IEEE Access 8 (2020): 127648-127658.

Grakovski, Alexander, et al. "Weight-in-motion estimation based on reconstruction of tyre footprint's geometry by group of fibre optic sensors." Transport and Telecommunication 15.2 (2014): 97.
Grattan, K. T. V., and T. Sun. "Fiber optic sensor technology: an overview." Sensors and Actuators A: Physical 82.1-3 (2000): 40-61.
Hall, A. J., and C. Minto. "Using fibre optic cables to deliver intelligent traffic management in smart cities." International Conference on Smart Infrastructure and Construction 2019 (ICSIC) Driving data-informed decision-making. ICE Publishing, 2019.
Hartog, Arthur H., Mohammad Belal, and Michael A. Clare. "Advances in distributed fiber-optic sensing for monitoring marine infrastructure, measuring the deep ocean, and quantifying the risks posed by seafloor hazards." Marine Technology Society Journal 52.5 (2018): 58-73.
G. Belitsky, V. Belitsky, and A. Liberson, "Mobile scales for trafficweighing based on optical fiber technology,"ICWIM7, p. 26, 2016.
D. M. Karabacak, J. A. O'Dowd, L. J. Hopman, and J. M. Singer, "Asphalt embedded fibre optic weigh-in-motion technology," ICWIM8,p. 185, 2019.
Inaudi, Daniele, and Branko Glisic. "Distributed fiber optic strain and temperature sensing for structural health monitoring." Proceedings of the Third International Conference on Bridge Maintenance, Safety and Management, Porto, Portugal. 2006.
James, Stephen W., and Ralph P. Tatam. "Optical fibre long-period grating sensors: characteristics and application." Measurement science and technology 14.5 (2003): R49.
Liu, Huiyong, et al. "Traffic flow detection using distributed fiber optic acoustic sensing." IEEE Access 6 (2018): 68968-68980.
Lydon, Myra, et al. "Development of a bridge weigh-in-motion sensor: performance comparison using fiber optic and electric resistance strain sensor systems." IEEE Sensors Journal 14.12 (2014): 4284-4296.
Lydon, Myra, et al. "Bridge weigh-in-motion using fibre optic sensors." Proceedings of the Institution of Civil Engineers—Bridge Engineering. vol. 170. No. 3. Thomas Telford Ltd, 2017.
Lydon, Myra, et al. "Recent developments in bridge weigh in motion (B-WIM)." Journal of Civil Structural Health Monitoring 6.1 (2016): 69-81.
Lydon, Myra, et al. "Improved axle detection for bridge weigh-in-motion systems using fiber optic sensors." Journal of Civil Structural Health Monitoring 7.3 (2017): 325-332.
Miliou, Amalia. "In-Fiber Interferometric-Based Sensors: Overview and Recent Advances." Photonics. vol. 8. No. 7. Multidisciplinary Digital Publishing Institute, 2021.
Mimbela, Luz-Elena Y., et al. Applications of fiber optics sensors in weigh-in-motion (WIM) systems for monitoring truck weights on pavements and structures. No. NM97ITD-02. New Mexico. Dept. of Transportation, 2003.
Mollahasani Madjdabadi, Behrad. "Experimental Evaluation of a Distributed Fiber Optic Sensor for Mining Application." (2016).
Optical Sensing Instrumental and Software User Guide—Revision Sep. 30, 2017.
Oskoui, Elias Abdoli. Methods and Applications of Structural Health Monitoring on Bridges. Diss. University of Illinois at Chicago, 2019.
Presti, Daniela Lo, et al. "Fiber bragg gratings for medical applications and future challenges: A review." IEEE Access 8 (2020): 156863-156888.
Al-Tarawneh, Mu'ath Ahmad. "In-pavement fiber Bragg grating sensors for weight-in-motion measurements." (2016).
Tosi, D., et al. "Weigh-in-motion through fibre Bragg grating optical sensors." Electronics letters 46.17 (2010): 1223-1225.
Yuksel, Kivilcim, et al. "Implementation of a mobile platform based on fiber bragg grating sensors for automotive traffic monitoring." Sensors 20.6 (2020): 1567.
G. Nosenzo, B. Whelan, M. Brunton, D. Kay, and H. Buys, "Continuous monitoring of mining induced strain in a road pavement using fiber bragg grating sensors," Photonic Sensors, vol. 3, No. 2, pp. 144-158, 2013.

* cited by examiner

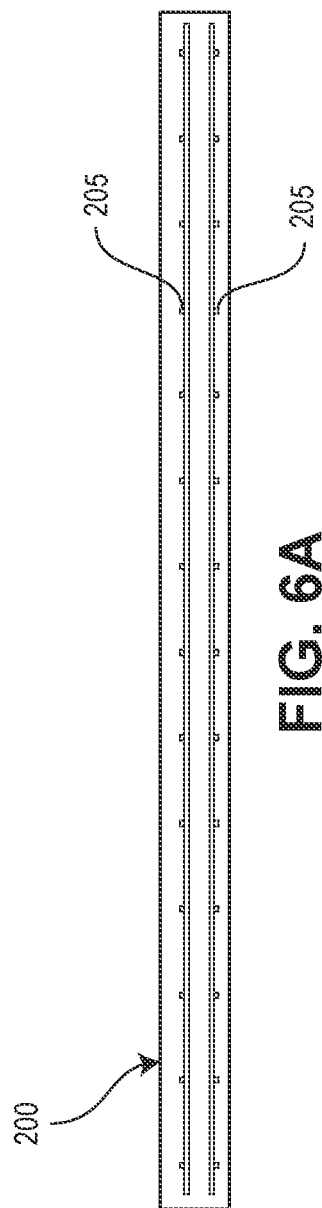
FIG. 6A
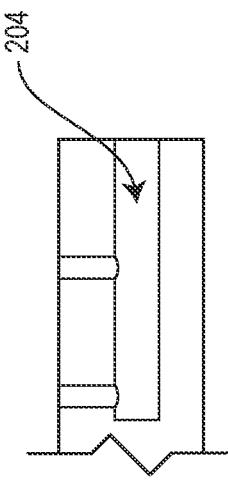
FIG. 6C
FIG. 6B

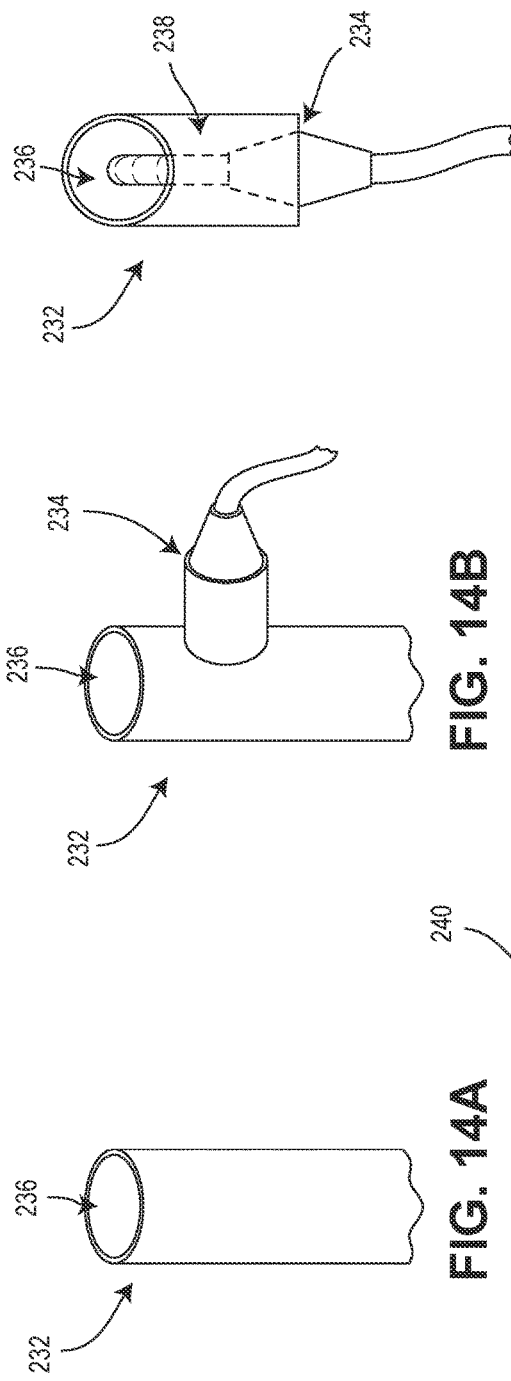
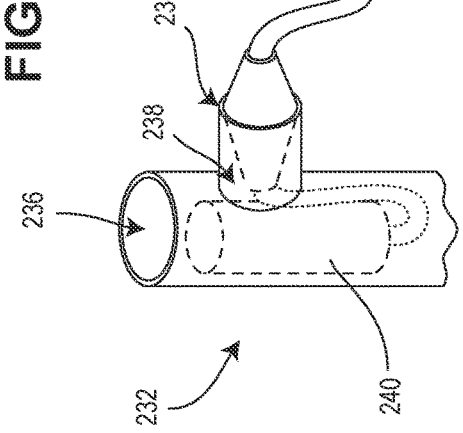
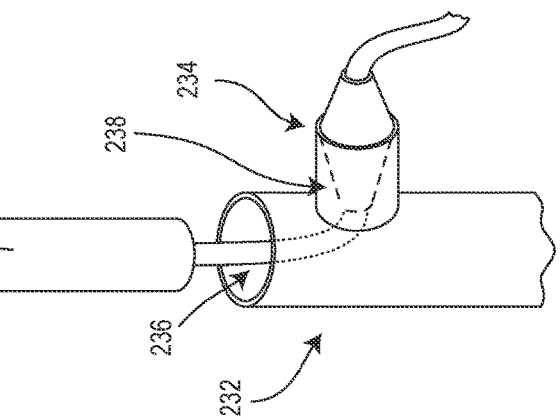

SENSOR DEPLOYMENT FOR MODULAR PAVEMENT SLABS

RELATED APPLICATIONS

The present application is a continuation of U.S. patent application Ser. No. 18/048,886, filed on Oct. 24, 2022, and entitled SENSOR DEPLOYMENT FOR MODULAR PAVEMENT SLABS which, in turn, is a continuation-in-part of U.S. patent application Ser. No. 17/851,163, filed on Jun. 28, 2022, and entitled SYSTEMS AND COMPUTER-IMPLEMENTED METHODS FOR ANALYZING TRANSFER OF FORCE THROUGH PAVEMENT SLABS, which claims priority benefit to U.S. Patent Application Ser. No. 63/076,767, filed Sep. 10, 2020, and entitled MODULAR PAVEMENT SLAB and is a continuation of U.S. patent application Ser. No. 17/471,470, filed on Sep. 10, 2021, and entitled SYSTEMS AND COMPUTER-IMPLEMENTED METHODS FOR ANALYZING TRANSFER OF FORCE THROUGH PAVEMENT SLABS which, in turn, is a continuation-in-part of U.S. patent application Ser. No. 17/226,159, filed on Apr. 9, 2021, and entitled MODULAR PAVEMENT SLAB, which, in turn, is a continuation of U.S. patent application Ser. No. 16/528,024, filed Jul. 31, 2019 (now U.S. Pat. No. 10,995,457) and entitled MODULAR PAVEMENT SLAB, which, in turn, is a continuation of U.S. patent application Ser. No. 15/889,718, filed Feb. 6, 2018 (now U.S. Pat. No. 10,407,838) and entitled MODULAR PAVEMENT SLAB, which, in turn, claims priority benefit to U.S. Patent Application Ser. No. 62/594,822, filed on Dec. 5, 2017, and entitled PAVEMENT, as well as to U.S. Patent Application Ser. No. 62/455,287, filed on Feb. 6, 2017, and entitled PAVEMENT. The entirety of each of the above-identification applications is hereby incorporated by reference into the present patent application.

BACKGROUND OF THE INVENTION

Field of the Invention

This invention relates generally to the field of pavement systems and, in particular, to pavement and methods of utilizing same for embedded self-monitoring of form and integrity.

Description of the Related Art

Pre-fabricated, modular pavement slabs have traditionally offered an attractive alternative to continuous pour systems at least because they can be individually removed, repaired and/or replaced with relative ease. Traditional continuous pour systems require significantly more time and/or money for removal and replacement.

However, pre-fabricated, modular pavement slab systems have untapped potential for enabling focused, quick and low-cost maintenance and/or repair. For instance, defect detection for the slab and/or sub-grade is still overwhelmingly performed using the same traditional tools used in continuous pour systems. A serviceable modular pavement slab is needed to improve the longevity and usefulness of such alternatives to continuous pour systems.

BRIEF SUMMARY

In a first aspect, a pavement system may be provided. The pavement system includes a slab having a body comprising pavement materials presenting a top surface. The system includes a reinforcement layer comprising geogrid materials embedded in the body, strain sensors fixed to the reinforcement layer, and a processor configured to collect multiple electrical signals across time from each of the strain sensors and to analyze the electrical signals to determine one or more of: (A) risk of a structural defect in the slab, (B) risk of a problem with underlying sub-grade beneath the slab, and (C) movement of passing objects across the top surface. The system may include additional, less, or alternate functionality or features, including that discussed elsewhere herein.

This summary is provided to introduce a selection of concepts in a simplified form that are further described below in the detailed description. This summary is not intended to identify key features or essential features of the claimed subject matter, nor is it intended to be used to limit the scope of the claimed subject matter. Other aspects and advantages of the current invention will be apparent from the following detailed description of the embodiments and the accompanying drawing figures.

BRIEF DESCRIPTION OF THE DRAWING FIGURES

Embodiments of the current invention are described in detail below with reference to the attached drawing figures, wherein:

FIG. 6A is a cross-sectional side view taken along line 6A-6A of FIG. 6 and showing top and bottom reinforcement mats;

FIG. 6B is a cross-sectional side view taken along line 6B-6B of FIG. 6 and showing a female connector pocket;

FIG. 6C is a cross-sectional side view taken along line 6C-6C of FIG. 6 and showing a male connector pocket;

FIG. 14A is a partial front view of an internal sidewall of a self-monitoring modular pavement slab defining a vertical cavity of an expansion port within a body of the slab according to embodiments of the present invention;

FIG. 14B is a partial side view of the expansion port of FIG. 14A, illustrating a horizontal cavity and connector terminal of the expansion port;

FIG. 14C is a bottom view of the expansion port of FIG. 14A, illustrating a cable attached to the connector terminal establishing electronic communication between the cable and an internal cable also terminated at the connector terminal;

FIG. 14D is a partial side view of the expansion port of FIG. 14C, additionally illustrating an expansion module attached to and in electronic communication with the cable;

FIG. 14E is a partial side view of the expansion port of FIG. 14D, illustrating the expansion module inserted into the vertical cavity of the expansion port;

Figure 15A:
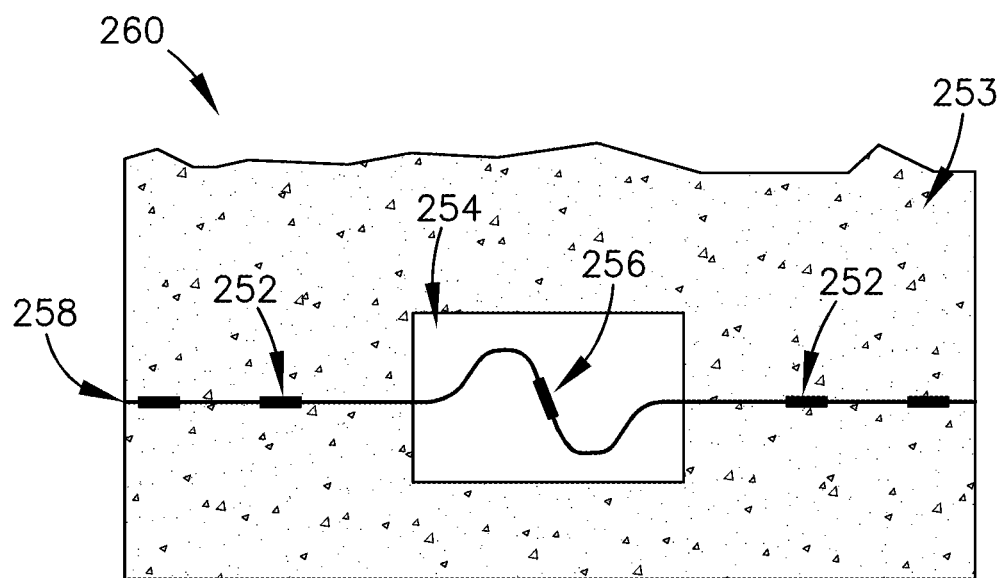
FIG. 15A is a partial cross-sectional side view of a fiber optic cable embedded in a self-monitoring pavement slab of embodiments of the present invention and having a vehicle position sensor and a temperature sensor in a first configuration in a sensor housing.
Figure 15B:
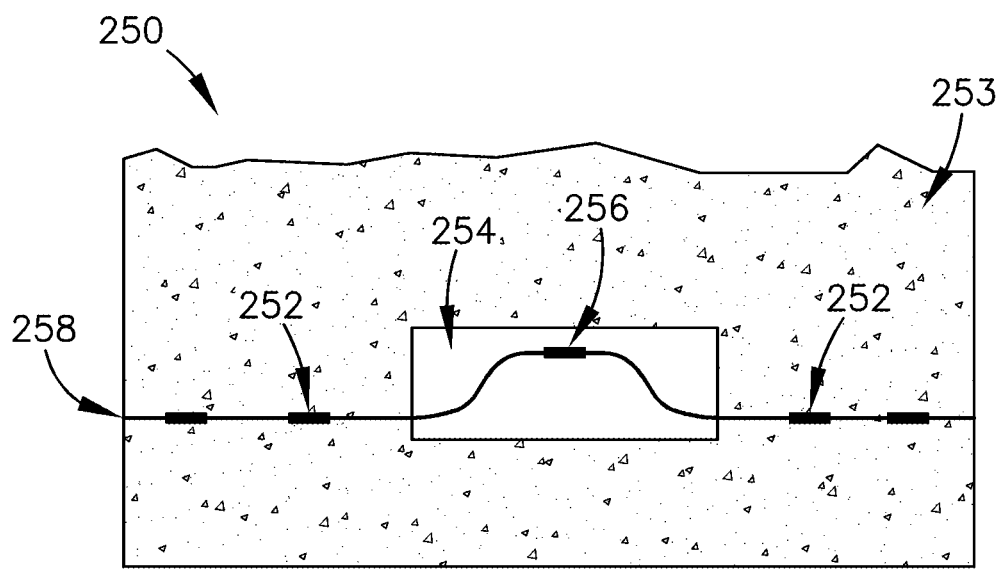
Figure 16:
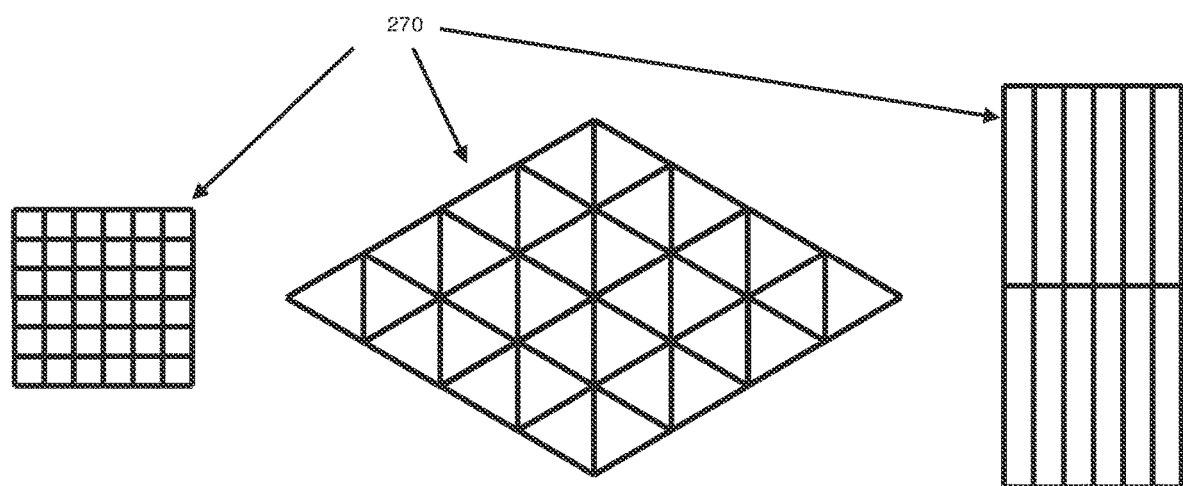

FIG. 15B is a partial cross-sectional side view of a fiber optic cable embedded in a self-monitoring pavement slab of embodiments of the present invention and having a vehicle position sensor and a temperature sensor in a second configuration in a sensor housing; and FIG. 16 includes top schematic views of three (3) reinforcement layer configurations in accordance with embodiments of the present invention.

The drawing figures do not limit the current invention to the specific embodiments disclosed and described herein. While the drawings do not necessarily provide exact dimensions or tolerances for the illustrated components or structures, the drawings are to scale as examples of certain embodiments with respect to the relationships between the components of the structures illustrated in the drawings.

DETAILED DESCRIPTION OF THE EMBODIMENTS

The following detailed description of the invention references the accompanying drawings that illustrate specific embodiments in which the invention can be practiced. The embodiments are intended to describe aspects of the invention in sufficient detail to enable those skilled in the art to practice the invention. Other embodiments can be utilized and changes can be made without departing from the scope of the present invention. The following detailed description is, therefore, not to be taken in a limiting sense. The scope of the present invention is defined only by the appended claims, along with the full scope of equivalents to which such claims are entitled.

In this description, references to "one embodiment", "an embodiment", or "embodiments" mean that the feature or features being referred to are included in at least one embodiment of the technology. Separate references to "one embodiment", "an embodiment", or "embodiments" in this description do not necessarily refer to the same embodiment and are also not mutually exclusive unless so stated and/or except as will be readily apparent to those skilled in the art from the description. For example, a feature, structure, act, etc. described in one embodiment may also be included in other embodiments, but is not necessarily included. Thus, the current technology can include a variety of combinations and/or integrations of the embodiments described herein.

Prior art precast slabs have long been recognized as an alternative to continuous pour solutions, which have been more popular traditionally within the United States. Part of the appeal offered by precast paving systems is serviceability-when a portion of pavement requires service, it may be removed and replaced with relative ease as compared with similar repair efforts using continuous pour solutions aimed at restoring the pavement to like-new condition. Nonetheless, defects within the body of a pavement slab and/or in the underlying sub-grade may exist for years prior to detection, which may lead to additional damage and more expensive repair efforts.

Embodiments of the present inventive concept improve existing detection methods and apparatus by providing a permanent, embedded form-monitoring system comprising a plurality of strain gauges distributed in an array across at least a portion of the length and width of each precast slab. The array may be substantially continuous in nature—for example, where the array includes one or more fiber optic cables extending in a pattern throughout the slab—and may collect data at a plurality of strain detection points regarding the transfer of force through a sensing volume. The data collected from the strain detection points may be analyzed locally within each slab, using an adjacent system proximate to the slab, and/or transmitted to a remote database for analysis against data from neighboring slabs to detect developing defects in the sensing volume and/or underlying sub-grade. The data may also or alternatively be put to additional uses, including vehicle monitoring providing positional data, vehicle weights, speeds, axle widths, axle lengths, traffic patterns, vehicle behaviors, and other information that can be detected through monitoring the internal and external deformations of the pavement slab.

Collection of data regarding changes over time in how a segment and its surrounding segments within the sensing volume transfer forces therethrough may permit modeling of sufficient resolution to detect defects in the paving apparatus and/or in the underlying sub-grade and/or to classify, quantify, relate and/or track external forces acting on the precast slab. Moreover, accelerations, gyroscopic motion, magnetic fields, temperature, salinity, water content and additional properties may be detected within each slab to enhance data resolution and permit easier identification of changes in slab form and/or integrity and/or to monitor atmospheric or environmental conditions.

Figure 1:
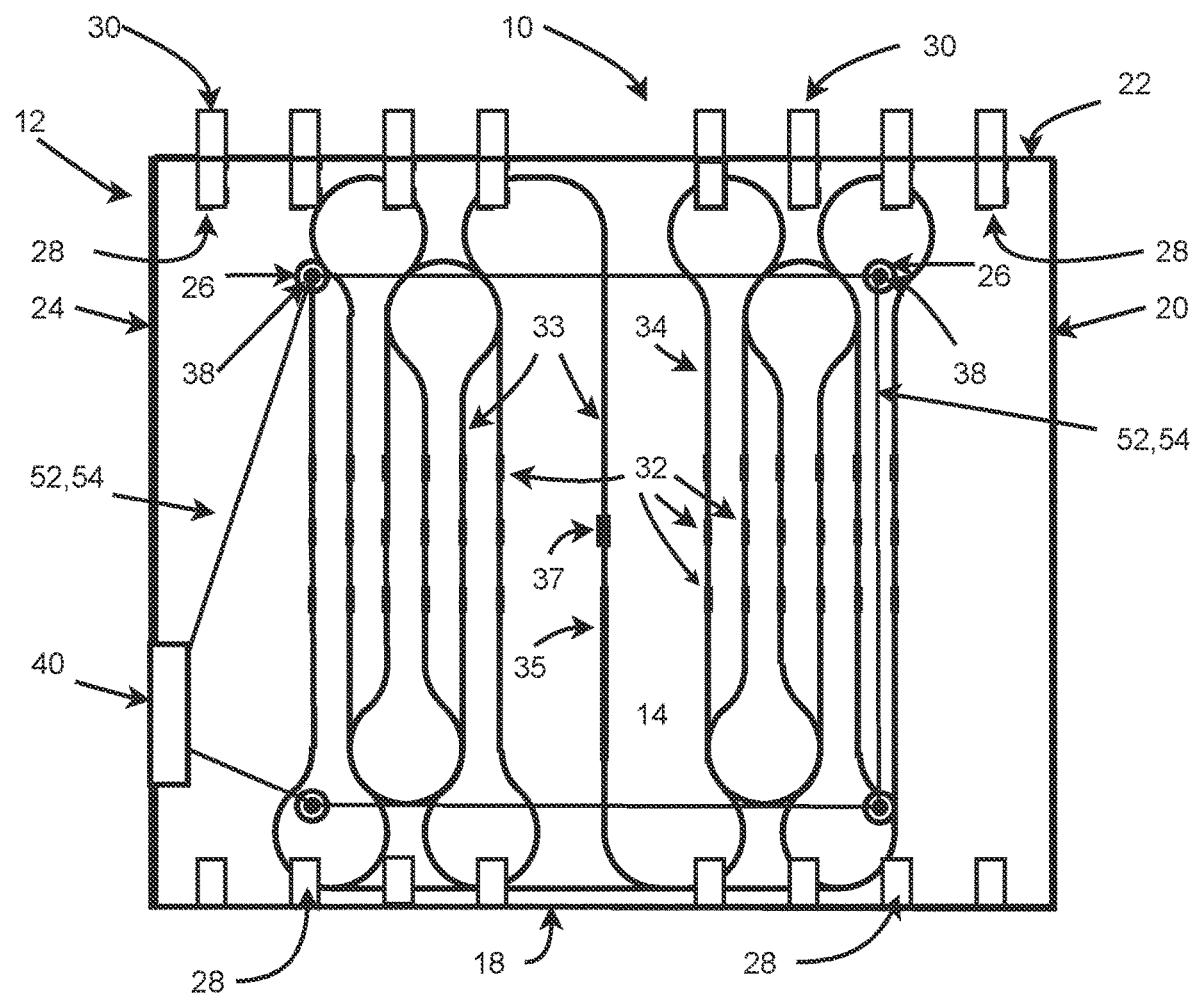
FIG. 1 is a top schematic view of a self-monitoring modular pavement slab according to embodiments of the present invention.
Figure 2:
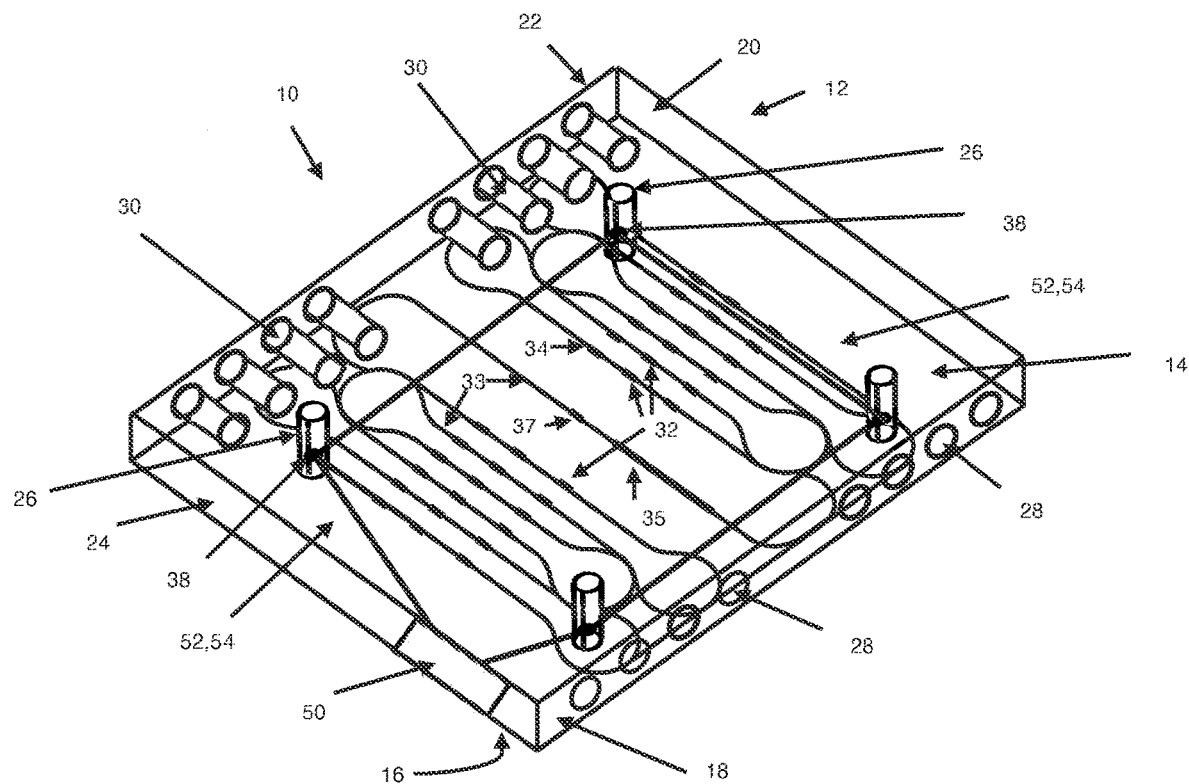
FIG. 2 is an elevated schematic view of the self-monitoring modular pavement slab of FIG. 1 illustrating a sensing body.

Turning to FIGS. 1-2, a precast, self-monitoring modular pavement slab 10 according to an embodiment of the present inventive concept broadly comprises a body 12 generally having a rectangular box shape with an upper surface 14, a bottom surface 16, and four side surfaces 18, 20, 22, 24. The body 12 may be composed primarily of precast concrete pavement. The body 12 may also or alternatively comprise asphalt, plastic material, fiberglass, carbon fiber, geopolymers and/or other materials that may serve as and/or support driving surfaces without departing from the spirit of the present inventive concept.

The modular pavement slab 10 may include a plurality of access ports 26 defined in and below the upper surface 14. The access ports 26 may house embedded lifting receivers (not shown) and are spaced for balanced lifting of the body 12. Access ports may also permit fluid communication between upper and bottom surfaces and may be configured to house and/or provide access to other sensing equipment (see incorporations by reference below) without departing from the spirit of the present invention.

Two opposing side surfaces 18, 22 define load transfer device (e.g., dowel) cavities 28 therein that extend within and toward the center of the body 12. Load transfer devices such as connectors and/or dowel rods 30 may extend at least partway out of the cavities 28—for example where the modular pavement slab 10 is assembled to neighboring structures such as other paving apparatus—and each may be secured in place within the slab and/or a neighboring structure, following assembly, using grouting or the like.

It is foreseen that additional of the substantially vertical side surfaces or faces of a body may include load transfer cavities and devices without departing from the spirit of the present inventive concept. It is also foreseen that other load-transferring structure, such as tie bars, may be used in lieu of or in addition to dowel rods without departing from the spirit of the present inventive concept. Moreover, in embodiments of the present invention, the choice of load-transferring structure employed along a side of a slab may at least in part depend on the orientation of the side with respect to direction of travel of vehicles or other loads across the top of the slab. For example, in an embodiment discussed in more detail below, dowel rods may be employed along faces or sides of the slab that are transverse to the direction of travel (i.e., extending in the "x" direction of FIG. 4.), and tie bars may be employed along faces or sides of the slab that extend in the direction of travel (i.e., extending in the "y" direction of FIG. 4).

A rubber skirt, backer board, spacing rod, tar mixture, grouting or similar buffering substance may also be placed in seams between a modular pavement slab and neighboring structures and/or below the modular pavement slab. A modular pavement slab preferably also includes an internal reinforcement grid (see, e.g., FIG. 6A), which may be comprised of at least one layer of steel rebar lattice or other known internal reinforcement structures such as fiberglass reinforcement mat, geotechnical mat, carbon fiber mat, or loose reinforcement material such as fiberglass fibers, carbon fibers, plastic fibers, metallic shavings, or any geogrid materials. In one or more embodiments, each reinforcement layer extends across at least seventy percent (70%) of the length and at least seventy percent (70%) of the width of a pavement slab, preferably substantially centered therein. In one or more embodiments, one or more reinforcement layers comprise a regular or repeating pattern extending along length and width axes, such as a rebar grid or the like (see, e.g., FIG. 16). More broadly, it is foreseen that embodiments of the present inventive concept are interoperable with the paving systems and apparatuses described in U.S. Patent Publication No. 2016-0222594 A1 to Sylvester and in U.S. Patent Publication No. 2017-0191227 A1 to Sylvester, each of which is hereby incorporated by reference herein in its entirety.

The modular pavement slab 10 also includes a plurality of sensors 32 comprising a strain sensor array 34 distributed at least partly across the length and width of body 12. Each sensor 32 may include optical fiber sensing technologies including but not limited to one or more of Rayleigh, Brillouin, Raman, or Fiber Bragg Grating (FBG) technologies, distributed along the length thereof. A single modular slab 10 may have plurality of fiber optic cables 33 within comprising the sensors 32. One of ordinary skill will appreciate that more or fewer fiber optic cables, each including a variable or consistent number, size and spacing of fiber optic sensors therealong, may be arranged in a variety of shapes and paths—whether considered in an xy plane, along a z axis and/or in a three-dimensional space—within the scope of the present invention.

In the described method using FBG sensors 32, the FBGs are positioned in each corresponding optical fiber cable 33 with selectable space therebetween. Each FBG, or any other method implemented as described above but not limited to those specifically named, provides a measurement of the strain of its surrounding environment, which is a local volume, element or region of the body 12. Alternatively, or additionally, each optical fiber sensor cable may include a plurality of individually packaged FBGs coupled to one another with a plurality of optical fibers, with each optical fiber coupling two FBGs and providing a transmission and reflection path to and from each FBG and/or completing a loop from an emitter to a receiver with a single FBG between. It should be noted that emitters and receivers of optical fiber sensors may comprise a single device or multiple devices.

Generally, FBG sensors 32 operate in connection with a sensor processor 38. A broad-spectrum light beam is transmitted through a fiber cable housing the FBG sensor 32 by the sensor processor 38. The FBG sensor 32 reflects a subset of the broad-spectrum light back to the source processor 38 and transmits all other light. The resulting back-propagating spectrum presents a peak centered at the Bragg wavelength. The spectrum of the beam that passed through resembles the spectrum of a notch filter. The Bragg wavelength is dependent on the grating pitch, which is a design parameter, and the refractive index of the fiber. Environmental factors such as strain and temperature of the medium to which the FBG sensor 32 or corresponding cable 33 is coupled will affect the Bragg wavelength.

For example, a Bragg wavelength written into a single mode fiber may experience a shift of 1.25 picometer per microstrain and 13.7 picometer per degree Celsius. In view of this information, condition(s) of the pavement, as well as real-time and long-term traffic information, can be gathered. In one or more embodiments, the FBG sensors 32 and/or corresponding cables 33 are tightly coupled to structures of the slab 10 as discussed in more detail elsewhere herein—for example, coupled to the pavement medium or pavement material and/or to associated reinforcement grids/structures or the like—for improved translation of induced strain on the slab 10 into modulation of the light passing through the FBG sensors 32. The optical fiber sensor 32 will generally modulate characteristics of the optical signal such as intensity, amplitude, wavelength, phase, polarization and/or time delay based on the induced strain, temperature and/or vibrations transferred through the surrounding pavement medium/material, reinforcement grid/structure or the like.

Two key performance metrics of the sensors 32 are sensitivity and resolution. Sensitivity represents the relationship between the variation of sensor output and corresponding variation in a measured variable. A sensor 32 is relatively more accurate when it has a higher sensitivity, i.e., small variations in the measured variable correspond to large variations in the output. A small change in the strain within the volume of the pavement material surrounding the FBG sensor 32 yields a large change in center wavelength of the reflected optical signal.

In turn, resolution describes the ability of the sensor 32 to detect relatively minor variations in a measured variable. More particularly, this relates to the sensor processor's 38 ability to produce precise output values. The sampling rate of the sensor processor 38, alternatively referred to as the "scanning rate" herein, is in an inverse relationship with the sensor resolution. That is, the higher the rate the sensor 32 can sense, the higher the uncertainty in the produced values. Similar principles govern distributed or quasi-distributed fiber optic sensors that are based on Rayleigh, Brillouin, and Raman scattering.

The strain sensor array 34 comprising fiber optic cable(s) 33 of FIGS. 1-2 is routed in a serpentine layout at a substantially constant height within the body 12. However, the array 34 may be implemented within the body 12 in an oval layout, a coil pattern layout, a grid pattern, or other geometric patterns and shapes, including those depicted in FIG. 6 described in more detail below, may traverse or be located at multiple heights or locations along a z axis, and/or may comprise individual fiber optic lines without departing from the spirit of the present invention. The array 34 may comprise one or a plurality of fiber optic sensor cables 33.

In addition, a first optical fiber cable may have a first layout, while a second optical fiber cable may have a second layout. The optical fiber cables may also occupy separate regions of the body 12 in an XY plane. In one or more embodiments, the optical fiber sensor cables may overlap one another in the XY plane, or may otherwise occupy the same region of the body 12 within a given plane. While the drawings demonstrate a single optical fiber cable 33, one or a plurality of additional fibers may be incorporated into the functional unit incorporating one or more fiber patterns, or fiber optic sensing methods, within the body of a slab.

The array 34 comprising fiber optic cable 33 containing fiber sensing elements 32 is embedded in slab 10 such that one or both ends of the fiber optic cable 33 terminate at or beyond the edge of the pavement slab 10, as discussed in more detail below.

Determining the configuration and characteristics of the array 34—including, for example, selecting the number, spacing, position and size of the sensing elements 32—relies at least in part on consideration of the anticipated size of the features and/or sensing volume(s) of the corresponding slab 10 that will be measured, the resolution to be provided by the array 34, and the sensitivity of the selected sensors/sensing elements 32.

In one or more embodiments, the array 34 incorporates sensors/sensing elements 32 having multiple different sizes, with each size being configured for optimized or improved measurement of one or more types of deformation, and with each such element 32 being positioned within the sensing volume accordingly. For example, the array 34 may include one or more small sensor(s) 32 at pre-determined location(s) within the sensing volume(s) proximate to or otherwise optimized for detection of tires moving across the upper surface 14 of the slab 10 (i.e., vehicle-strain sensors), and one or more large sensor(s) 35 at pre-determined location(s) susceptible to or otherwise optimized for detection of significant or large cracks within the pavement slab 10 (i.e., degradation-strain sensors).

Accordingly, the total number of sensors 32, and the sensors' 32 positions within the paving slab 10, may be selected based at least in part on their respective intended utility and usage. For example, in connection with configuring a slab 10 to read transient signals from a vehicle passing over the pavement slab 10, the number, size, and placement of the sensors 32 may be chosen to ensure the array 34 is capable of sufficiently detecting and identifying individual vehicle tires, as well as measuring the location, weight, and dimensions of those tires. A similar criterion may be used for the detection of the pavement and subgrade condition.

The sensing volume(s) of the slab 10 may be considered as a grid of zones or pixels divided along the lateral and longitudinal dimensions. Design processes may locate sensors 32 along such a grid to optimize data gathering and/or signal quality of one or more of the sensors 32, taking into account the collective and/or individual data-gathering objectives of the sensors 32. For example, sensors 32 of the optical fiber cable 33 may be placed at positions along the grid such that the correspondingly measured data enables modeling or other mapping of stresses from masses on one or more regions of the upper surface 14. Moreover, such placement and other characteristics of the sensors 32 may be optimized to improve identification of such masses, for example through identification of type, position, and source/vector of those masses (e.g., vehicles or the like). Similarly, the location and orientation of the fiber optic sensing elements 32 may be chosen to maximize or optimize sensitivity between one or more variable(s) to be measured and the corresponding output of the sensing element 32. For example, depth and XY plane position(s) of the embedded sensing element(s) s 32 within the pavement slab 10 may be selected to optimize sensitivity and the corresponding quality of one or more collected data type(s).

Where detecting vehicles moving across the upper surface 14, the sensing elements 32 may be positioned in corresponding region(s) of the sensing volume(s) of the slab 10 in which strain induced by movement of the external force of such movement through the slab 10 is at a local or slab-wide maximum. Such placement may improve the accuracy and precision of the sensor output and, accordingly, of the model(s) and/or algorithm(s) reliant thereon.

As noted above, placement of sensor elements 32 within the sensing volume(s) of the slab 10 may vary based on the sensing application(s) assigned to each such element 32. For example, where an element 32 is tasked with identifying load transfer efficiency between two adjacent slabs 10 (or adjacent segments of other types of pavement), the element 32 may be placed at or near one or more endpoints of a lever embodied by or corresponding to load transfer elements (e.g., dowel rods 30). However, in one or more embodiments, the element(s) 32 are not located along the portions of the cable(s) 33 overlapping (in an xy plane) the dowel rods 30 and/or cavities 28, though such overlapping may nonetheless enhance sensing accuracy of the array 34.

The orientation of the sensing element 32 may also be configured to enhance, optimize and/or maximize sensitivity between one or more variables to be measured and the output of the sensing element 32. For example, a longitudinal axis of a section of optical fiber cable 33 including the sensing element 32 may be oriented substantially parallel to (e.g., parallel to or within a ten degree (10°) deviation on either side of) a direction of travel to enhance sensitivity when measuring position(s) of a vehicle traveling (e.g., longitudinally) along the upper surface 14 of the slab 10. This may produce a clearer signal than would transverse or other orientations.

The sensing element(s) 32 may also be configured to operate at one or more sensing rate(s) and resolution(s), and/or range(s) for same. Such configuration may depend on the corresponding application or intended use of the element(s) 32. For example, a higher sensing rate may be used to produce higher time resolution signals. However, such a sensing rate may also introduce more uncertainty in the sensor's 32 output. Conversely, a lower sensing rate may produce higher precision output but lower space and time resolution, making such a configuration less desirable for detecting, identifying and/or tracking higher speed vehicles, particularly wherever fewer sensors are available to be dedicated to the task. For another example, if tire weight is the variable to be measured, a relatively lower resolution sensor 32 may produce a precision range measured in tens of pounds, whereas a higher resolution sensor may produce a precision range measured in tenths of a pound.

Fiber optic cable(s) 33 of the array 34 may also have coatings and/or may be housed in casings that are optimized according to intended use(s) and/or application(s). For example, the cable(s) 33 may have polymer-type material coating to increase sensitivity or may be housed in a casing to minimize registered strain caused by objects moving along the upper surface 14 so that the sensor(s) 32 can produce output used to measure/track temperature. For difficult environments like alkaline concrete or hot mix asphalt, application-specific coatings may be required to ensure that the fiber elements aren't damaged by the materials they're embedded within.

An exemplary sensor 37 is illustrated in FIGS. 1-2. The sensor 37 may be an FBG or another optical fiber cable sensor, similar to the other sensors 32, but may be configured particularly for sensing temperature. Temperature readings may be taken into account when interpreting data generated by the other sensors 32 to increase accuracy and/or precision of such interpretation.

In one or more embodiments, the sensor 37 may be encapsulated by a different housing than the sensors 32, for example where a glass fiber reinforced polymer (GFRP) or nylon coating is used to house the sensors 32 and a rigid PVC type polymer is used for the (temperature) sensor 37 to isolate the structural strains induced. Moreover, the sensor 37 may be separated from its surrounding housing (e.g., PVC type polymer) by an air gap of a minimum separation, whereas the sensors 32 may comprise a fiber optic cable, optionally with coating, in intermittent or continuous direct contact with surrounding pavement materials (i.e., with minimal or no air gap around the cable provided by surrounding housing). To provide for this minimum separation air gap, the inner diameter of the housing for the sensor 37 may be between four-tenths of an inch and two inches (0.4-2 inches). The sensor 37 may also be centrally located along the slab 10—as illustrated—to provide data usable to inform and improve interpretation of the readings of sensors 32 located variously around it across the slab 10. It should also be noted that the temperature sensor 37 preferably has a scanning rate that matches or nearly matches (i.e., is within ten percent (10%) of) the scanning rate employed by each of the other sensors 32 (discussed in detail elsewhere herein).

Turning briefly to FIGS. 15*a-b*, configurations of an optical fiber cable 258 are illustrated. Sensors 252 are attached to a body 253 of the slab and/or to embedded reinforcement layer(s) (not shown in FIG. 15, but discussed in more detail elsewhere herein). The sensors 252, like sensors 32 discussed above, are sensitive to deformation throughout the body 253 induced by surrounding temperature, external moving objects, and permanent structural damage. However, sensors 256, while also forming a part of the optical fiber cables 258, are hosted in special housings 254 partially or completely structurally isolating the sensors 256 from the surrounding modular pavement slab body 253, like sensors 37 discussed above. Therefore, deformations within the volume of the body 253 of the slab around the housing 254 are partially or completely absorbed or deflected by the housing 254. In one or more embodiments, a majority of the deformation of the body 253 due to external moving objects that is sensed by the sensors 252 is deflected around, and therefore not sensed by, the sensors 256. In one or more embodiments, a majority of the deformation of the body 253 due to permanent structural deformation that is sensed by the sensors 252 is deflected around, and therefore not sensed by, the sensors 256. This allows sensor 256 to be relatively insensitive to permanent structural deformations and temporary deformations caused by the external moving objects. Sensors 256, in this way, act primarily or solely as temperature sensors measuring strains induced by temperature shifts. The temperature shifts cause changes in the physical characteristics of the fiber optic cable 258. In particular, glass refractive index of the fiber optic cable changes in a linear fashion as the temperature of the fiber optic cable changes. This in turn changes the fiber optic sensors' output as light's interaction with the sensor changes.

It should also be noted that, despite the relative isolation of sensors 256 from certain structural deformations of the body 253 of the slab, strains within the body 253 near the housing 254, may cause strains along the cable 258, particularly on the cable 258 at entry and exit points of the housing 254. This may cause deformation of the cable 258 that is in the housing 254 in the form of compression and elongation. To reduce or eliminate the influence of this type of strain on the readings of the temperature sensor 256, additional length of fiber 258 may be inserted into the housing 254. The additional length is selected such that the expected deformations along the cable 258 within the housing 254 do not cause sufficient axial strain on sensor 256 to materially degrade or otherwise negatively impact the temperature readings of the sensor 256. The length and/or diameter or other dimensions of the housing 254 are also preferably chosen or configured to permit the sensor 256 to be fully encased in the housing 254 with additional length of cable 258. In one or more embodiments, the length of the cable within the housing is at least one percent (1%) greater than a shortest distance between the entry and exit points of the housing. In a preferred embodiment, the length of the cable within the housing is between one percent (1%) and ten percent (10%) greater than the shortest distance between the entry and exit points of the housing. FIGS. 15*a-b* illustrate optional variations for incorporating the additional length of cable 258 in the housing 254.

In an exemplary embodiment, the housing 254 is made of synthetic polymer materials. Some examples are glass fiber reinforced polymer, polyvinyl chloride, and polyethylene.

One of ordinary skill will appreciate that other housings and locations for temperature sensors may be used without departing from the spirit of the present invention. For example, a temperature sensor may be embedded with and/or laminated to a reinforcement layer (e.g., rebar mesh) and/or may be encapsulated within a gold-coated resin housing within the scope of the present invention.

These systems may also incorporate different fiber types in any of the above-described embodiments, for example a single fiber system or sensor array may include strain gauges (e.g., vehicle-strain and integrity sensors), temperature gauges, microphone gauges, or other types of gauges and/or sensors.

The positioning of the sensing elements 32 (e.g., FBGs or alternative sensing elements) within each optical fiber cable 33 may be selected in combination with the layout of each optical fiber sensor 32 to establish a desired resolution of the strain measurements throughout the volume of the body 12 (e.g., within the boundaries of the body 12 illustrated in FIG.

2) and/or with respect to the surface area of the upper surface 14 of the body 12. For example, a smaller spacing between FBGs within the optical fiber cable 33 produces a greater resolution of strain measurements, while a larger spacing leads to lower resolution. In addition, certain layout patterns of the optical fiber cable(s) 33—such as a serpentine or coil—produce a greater resolution of strain measurements, while patterns such as a circle provide lower resolution.

In an embodiment, a strain sensor array may include at least two optical fiber sensor cables (not shown) arranged in a linear layout and positioned within a slab along the length thereof. In such embodiments, optical fiber sensors in this embodiment may extend along a length of the slab positioned in proximity to, and association with, a wheel path of vehicles travelling on a corresponding apparatus. For example, a first and a second optical fiber sensor cable may be placed closer to outer edges of the slab along the wheel paths of most automobiles and trucks. A third optical fiber sensor cable may be placed close to the center of the slab along the wheel path of a motorcycle. It is foreseen, however, that in certain embodiments strain sensor arrays may include a plurality of strain sensors distributed across a portion of the length and width of the paving apparatus without departing from the spirit of the present inventive concept. One of ordinary skill will also appreciate that arrays including other types of similar fiber optic sensors and/or solid-state strain gauges, vibrating wire strain gauges, load cells, piezo-electric elements and/or similar known sensors are within the scope of the present invention.

While it is foreseen that embodiments of the present inventive concept may be constructed in the field or on site—for example as part of a cast-in-place installation—or be pre-fabricated into an assembly that can be installed into alternative paving materials such as asphalt or cast-in-place concrete, it is preferred that the strain sensor array 34 be encased and permanently fixed within body 12 during an offsite pre-fabrication process. In one or more embodiments, the strain sensor array 34 is embedded into the body 12 by an automated fabrication process at a facility prior to a pavement service date, enhancing accuracy and consistency relative to other construction methods and reducing the need for manual and/or onsite sensor calibration efforts.

The optical fiber sensors 32 and cable(s) 33 may be fixed to (attached to, embedded with, laminated to or the like) one or more sides of a reinforcement layer (not shown, but see, e.g., FIGS. 2-4 of U.S. Patent Publication No. 20170191227A1) of the modular pavement slab 10 during fabrication, essentially extending in a substantially horizontal (XY) plane at a given height within the body 12. More preferably, the optical fiber sensors 32 and sensor cables 33 may be laminated and/or fixed to a bottom side of a lower or bottommost reinforcement layer of the modular pavement slab 10. Placement near the bottom of the body 12 (e.g., in a bottom half of the body 12) may provide greater resolution from and/or amplification of data collected by the strain sensor array 34 and/or may increase the sensitivity of the sensors 32. Moreover, fixing the strain sensor array 34 to a reinforcement layer may generate a more holistic data set representing changes in form across the entire body 12 because a preferred reinforcement layer will extend across substantially the entire length and width of the body 12 and may be less susceptible to localized distortions resulting from pockets or imperfections in the body 12. The optical fiber sensors 32 may extend along at least seventy percent (70%) of the length of a reinforcement layer of a segment of pavement, and/or along at least seventy percent (70%) of the width of the reinforcement layer, in one or more embodiments.

It is foreseen that all or portions of a strain sensor array may be encased at different and/or varying heights within a slab without departing from the spirit of the present inventive concept. For instance, disposing at least one sensor at a different height within the slab—such as vertically above or below a second sensor—may provide additional resolution for detecting defects in the slab. However, long dimensions of optical fiber sensors are preferably in substantial alignment with a direction of travel, for example along a length axis, which may improve detection of vehicular load progression across a top surface of the slab. Dimensions of optical fiber sensors that are transverse or perpendicular to the direction of travel may improve detection of the lateral position of such a vehicular load on the slab. It is foreseen that a preferable arrangement of optical fiber sensors, each sensor having a region of the pavement surface that it can optimally sense, and each sensor having an orientation that improves detection of the longitudinal or lateral position of the vehicle load and position, will result in a sensor layout presenting a grid of sensors oriented in the traverse and longitudinal dimensions such that their sensing areas overlap each other in the x and y dimensions to ensure that a maximum area of the pavement can be sensed simultaneously by one or more sensors (e.g., oriented to the direction of travel and/or lateral position of the vehicle load on the slab).

Figure 3:
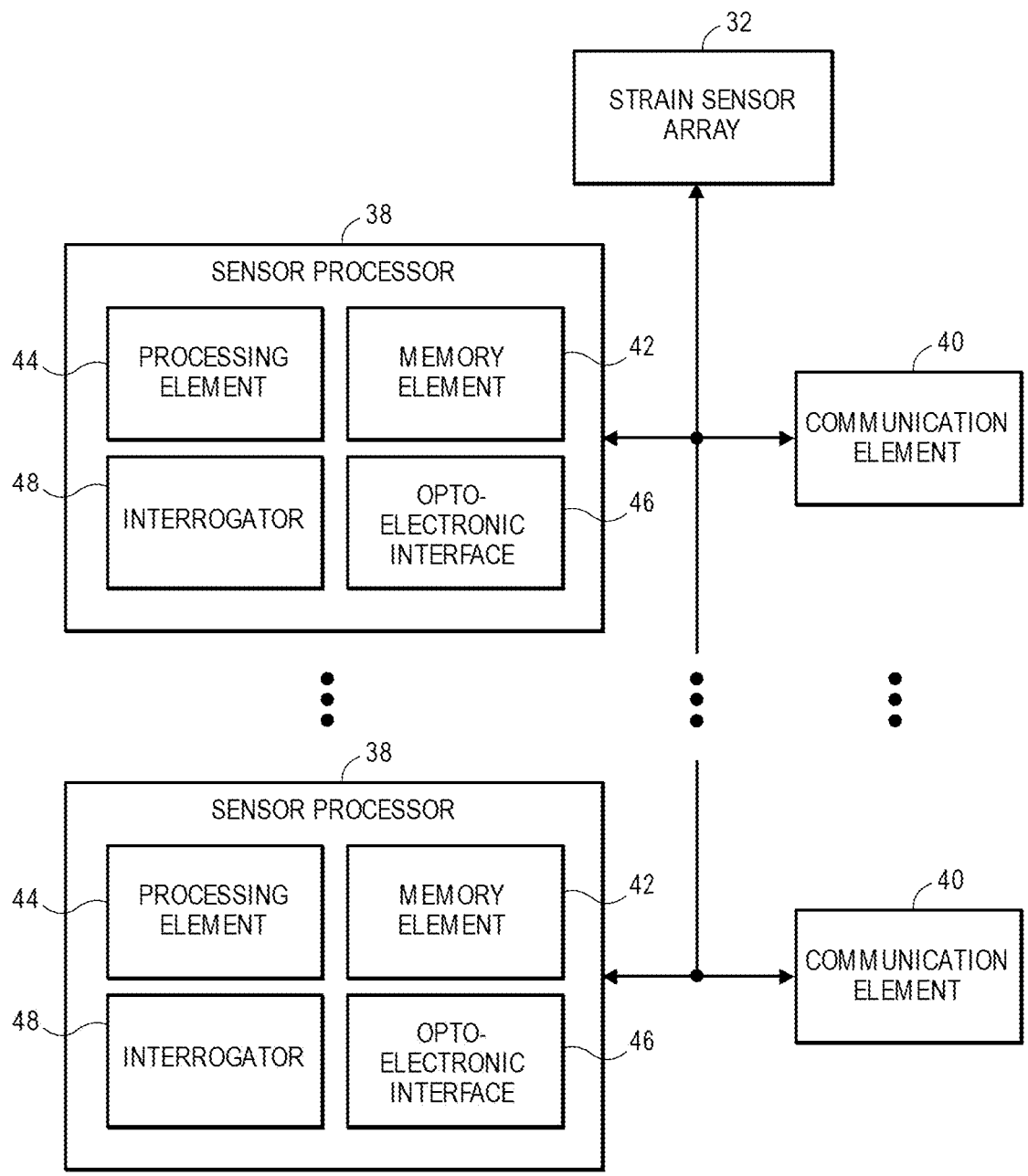
FIG. 3 is a schematic block diagram of various electronic components of the self-monitoring modular pavement slab of FIG. 1.

The modular pavement slab 10 also may include at least one sensor processor 38 and at least one communication element 40 to provide signal control and processing as well as communication, as shown in FIG. 3. The sensor processor 38 includes a memory element 42, a processing element 44, and an optoelectronic interface 46. Each sensor processor 38 may be retained within a housing that is accessible through a successive one of the access ports 26. In addition, each sensor processor 38 may be removable and replaceable, and access for such removal may be protected by a keyed security device—such as an interlock connecting the housing to the body 12 and requiring a special tool to disconnect—and/or grouting or the like. Alternatively, the control system in FIG. 3 may lie in a separate enclosure outside the pavement slab (see discussion of FIGS. 4-9 below) whether through a direct connection or by making use of the edge connector as shown in FIGS. 10 through 13.

The memory element 42 may be embodied by devices or components that store data in general, and digital or binary data in particular, and may include exemplary electronic hardware data storage devices or components such as read-only memory (ROM), programmable ROM, erasable programmable ROM, random-access memory (RAM) such as static RAM (SRAM) or dynamic RAM (DRAM), cache memory, hard disks, floppy disks, optical disks, flash memory, thumb drives, universal serial bus (USB) drives, or the like, or combinations thereof. In some embodiments, the memory element 42 may be embedded in, or packaged in the same package as, the processing element 44. The memory element 42 may include, or may constitute, a "computer-readable medium". The memory element 42 may store the instructions, code, code statements, code segments, software, firmware, programs, applications, apps, services, daemons, or the like that are executed by the processing element 44. The memory element 42 may also store settings, data, databases, and the like.

The processing element 44 may include electronic hardware components such as processors, microprocessors (single-core or multi-core), microcontrollers, digital signal processors (DSPs), field-programmable gate arrays (FPGAs), analog and/or digital application-specific integrated circuits (ASICs), or the like, or combinations thereof. The processing element 44 may generally execute, process, or run instructions, code, code segments, code statements, software, firmware, programs, applications, apps, processes, services, daemons, or the like. The processing element 44 may also include hardware components such as finite-state machines, sequential and combinational logic, and other electronic circuits that can perform the functions necessary for the operation of the current invention. The processing element 44 may be in communication with the other electronic components through serial or parallel links that include universal busses, address busses, data busses, control lines, and the like.

The optoelectronic interface 46 generally converts electronic signals to optical signals and vice versa. The optoelectronic interface 46 may include photonic generator(s), such as light-emitting diodes (LEDs), lasers including top emitters, edge emitters, or the like, as well as photodetectors, such as photodiodes, phototransistors, photoresistors, phototubes, or the like. The optoelectronic interface 46 may further include electronic circuitry such as amplifiers, filters, analog-to-digital converters (ADCs), digital-to-analog converters (DACs), and so forth. The optoelectronic interface 46 receives electronic signals and converts them to transmitted optical signals, i.e., electromagnetic radiation having a plurality of wavelengths in the visible and/or infrared regions of the electromagnetic spectrum. The optical signals correspond to the electronic signals in amplitude, frequency, and duration. The optoelectronic interface 46 receives optical signals and converts them to generated electronic signals having a voltage level, current level, power level, or the like corresponding to the optical signals in amplitude, frequency, and duration. The optoelectronic interface 46 may also generate an electronic data stream that corresponds to the received optical signals.

Through hardware, firmware, software, or various combinations thereof, the sensor processor 38 may be configured or programmed to perform at least the following functions. The sensor processor 38 generally controls the operation of the strain sensor array 34 by generating the input signals and communicating them to the strain sensor array 34 and receiving and processing the output signals of the strain sensor array 34. In some embodiments, a single sensor processor 38 may be coupled to and control the operation of a plurality of optical fiber sensor cables 33. In other embodiments, the modular pavement slab 10 may include multiple sensor processors 38, each coupled to and controlling the operation of a respective one of the optical fiber sensor cables 33. The sensor processor 38 further includes an interrogator 48 as a function of the processing element 44 or as a separate component. In some embodiments, the interrogator 48 may further include, or be in electronic communication with, the optoelectronic interface 46. Utilizing the interrogator 48, the sensor processor 38 generates a plurality of optical signals, each having a unique center wavelength, which are transmitted through the optical fiber sensors 32. The optical signals may be transmitted simultaneously or sequentially. The parameters of the optical signals transmitted by the sensor processor 38 may be selectively programmable.

In the illustrated embodiment, all of the optical signals are received by each FBG 32 in the optical fiber sensor cables 33. But, each FBG 32 may reflect only the optical signal whose wavelength is the same as the one the FBG 32 is designed to reflect. Furthermore, the characteristics of the reflected optical signal, such as intensity change, amplitude change, time delay, and/or shifted wavelength, may vary according to the strain experienced by the FBG 32, thus providing a measurement of the strain on the body 12 in the local volume surrounding the FBG 32. The sensor processor 38 receives all the reflected optical signals and analyzes them to determine the strain at each location of an FBG 32. In addition, the sensor processor 38 repeats this process dozens or hundreds of times per second.

The sensor processor(s) 38 may create a virtual database or table of measured strain values that is stored in the memory element 42. The virtual database may include a plurality of historically-recorded strain values for each FBG. Since the X and Y coordinate locations (with respect to the upper surface 14 of the body 12) of each FBG are known, the sensor processor 38 may create a time-varying virtual map of strain values experienced by the body 12 resulting from the weight or mass of vehicles and other objects (such as pedestrians) travelling across the upper surface 14 thereof—each strain value indicating a strain experienced over time by a successive one of a plurality of regions of the body 12. In addition, utilizing the change in strain along a particular path or in certain areas, such as vehicle wheel paths, the sensor processor 38 can determine a velocity vector, i.e., a speed and direction, of the objects traversing the upper surface 14. Furthermore, the sensor processor 38 may utilize a lookup table or machine learning or artificial intelligence techniques to determine a type of vehicle that is traversing the upper surface 14 based on dynamic characteristics, such as a magnitude of change in amplitude, of the measured strain values.

The communication element 40 generally allows communication with external systems or devices. The communication element 40 may include signal and/or data transmitting and receiving circuits, such as antennas, amplifiers, filters, mixers, oscillators, digital signal processors (DSPs), and the like. The communication element 40 may establish communication wirelessly by utilizing radio frequency (RF) signals and/or data that comply with communication standards such as cellular 2G, 3G, 4G, LTE, or 5G, Institute of Electrical and Electronics Engineers (IEEE) 802.11 standard such as WiFi, IEEE 802.16 standard such as WiMAX, Bluetooth™, or combinations thereof. In addition, the communication element 40 may utilize communication standards such as ANT, ANT+, Bluetooth™ low energy (BLE), the industrial, scientific, and medical (ISM) band at 2.4 gigahertz (GHz), commercially available or customized Radio Frequency Identification (RFID), or the like. Alternatively, or in addition, the communication element 40 may establish communication through connectors or couplers that receive metal conductor wires or metal conductor cables which are compatible with networking technologies such as ethernet. In certain embodiments, the communication element 40 may also couple with optical fiber cables.

In some embodiments, the modular pavement slab 10 may include a single communication element 40 that is in electronic communication with the one or more sensor processors 38. In other embodiments, the modular pavement slab 10 may include a plurality of communication elements 40, each communication element 40 in electronic communication with a respective one of the sensor processors 38. In any case, the communication element 40 may receive measured strain values, velocity data, and vehicle data from one or more of the sensor processors 38 and communicate the data to other sensor processors 38 in the same modular pavement slab 10 or other slabs 10 or external devices or systems, such as through Bluetooth™, WiFi, and/or cellular protocols. The communication element 40 may also receive programming data or instructions for the sensor processors 38 to operate the strain sensor array 34 from external devices or systems or other apparatuses 10. The programming and instructions may be communicated to the appropriate sensor processors 38.

In various embodiments, the modular pavement slab 10 further includes a plurality of communication ports 50. Each communication port 50 may include a plurality of electrical and/or optical connectors. Each of the connectors, whether electrical or optical, may couple directly with a corresponding connector on the communication port 50 of another modular pavement slab 10 or with electrical cables or optical fibers that couple to other communication ports 50 and/or to remote embodiments of sensor processor 38. Each communication port 50 may be positioned on a successive one of the four side surfaces 18, 20, 22, 24 of the body 12, typically close to the center of the side surface, such that, when the apparatuses 10 are placed next to one another to form a road, the communication port 50 of one modular pavement slab 10 aligns with, and may couple to, the communication port 50 of its adjacent modular pavement slab 10. In one or more embodiments, the communication port 50 may also or alternatively provide an interface providing connectors to link internal and external elements of optical fiber sensor cable(s) 33 and remote embodiments of sensor processor(s) 38. In addition, each communication port 50 is in electronic communication with one or more communication elements 40 to enable communication of measured strain values, velocity data, and vehicle data from one or more of the sensor processors 38.

Communication ports 50 may also be referred to as "edge connectors" (an exemplary embodiment of which is described in more detail below in connection with FIGS. 10-13). The ports 50 enable internal elements of the pavement (e.g., communication elements 40, optical fiber sensors 32, sensor processors 38, or the like) to terminate along one or more edges of the slab. The ports 50 thus provide a connectorized interface for communication between elements 40 and/or processors 38 and other slabs 10 and/or communication network(s) (see FIG. 4). This may enable replacement of interconnect elements (e.g., at the interface) without modifying communicating electronic elements embedded more deeply or permanently within the slab 10. The ports 50 may permit each slab 10 to electronically communicate with external elements (e.g., with communication network 102 of FIG. 4) independently and/or via "daisy-chaining" among multiple slabs 10 arranged in sequence.

The modular pavement slab 10 also includes data and/or power lines 52, 54 extending between sensor processors 38 and communication elements 40. It is foreseen that the illustrated pattern of wired connection between electronics of the modular pavement slab 10 may vary, and/or that wireless communication routers may be used, without departing from the spirit of the present inventive concept. It is also foreseen that lines, cables and/or wires described herein for data and/or power transfer may comprise a variety of materials—including cable, fiber and wires of various materials—without departing from the spirit of the present inventive concept.

In operation, as a load is applied to upper surface 14, the applied force may propagate through segments of the sensing volume, creating temporary (and, possibly, permanent) deformations in the material of body 12. As the propagating force deforms areas surrounding the strain sensor array 34, strains are sensed by the optical fiber sensors 32 and determined by one or more sensor processors 38. The time-varying measured strain data may be recorded and stored in one or more memory elements 42 and utilized to determine the presence and/or location of vehicles on the upper surface 14, as well as their orientations, directions, speeds, weights, tire pressures, and other data points which may be derived from such strain distributions.

Loads on the sensing volume of the body 12 may be continuously sensed over long periods of time, with significant strain response differences or localized variances in how forces move through segments of the sensing volume being noted as potentially indicative of defects in and/or damage to body 12 and/or the underlying sub-grade. Such data may be transmitted remotely for further processing against data gathered from surrounding slabs, or across time within any given slab, which may provide further clarity regarding the potential cause(s) of irregularity, such as by providing relative control groups of how nearby slabs are reacting to loads.

For example, taking certain aspects of one or more slabs as constant-such as installation on relatively consistently-graded surfaces, relatively consistent slab construction and dimensions, and relatively consistent traffic loads—data regarding differences in paving element response (e.g., differences in relative movement and load transfer through different elements of the slab(s)) can reveal problems with or changing conditions in sub-grade, damage to the body 12 or a portion thereof, changes in internal strain and/or transfer, and other problem areas requiring maintenance in the short- or long-term.

Sensor data may also or alternatively be analyzed locally and/or remotely in real time for use by navigation (e.g., autonomous) guidance systems, emergency alert and car deviation systems, and for other uses. Data obtained from the strain sensor array 34 may also be used to measure internal and applied loads, deflection, 3D shape, moisture content, vibrations and/or temperature. The data may be analyzed to indicate vehicle location, orientation, speed, weight, and the like.

For instance, the communication elements 40 may establish direct and/or indirect communication(s) with vehicles for transmitting raw and/or processed data collected via the strain sensor array 34. Such data may be used in connection with autonomous and/or self-driving technologies (e.g., Level 4 autonomous driving). In an embodiment, one or more of the communication elements 40 may continuously or periodically transmit such data—i.e., regarding objects and/or vehicles present on the slab 10 (e.g., position, velocity, weight, etc.)—to one or more autonomous vehicles to support automated navigation. In a more particular embodiment, data obtained via the strain sensor arrays 34 of a system of slabs 10 may comprise and/or be integrated into vehicular location, positioning, navigation, telemetry, or obstacle avoidance systems to provide and/or improve accuracy of positional data in support of autonomous driving operations.

In addition, the communication elements 40 may receive data and/or information from vehicles implementing autonomous and/or self-driving technologies that are in the vicinity of, or traveling upon, the corresponding slab 10. The data and/or information may include velocity and/or heading information, vehicle identification information, and the like. The data and/or information may be utilized by the slab 10 for verification purposes, fault detection or correction purposes, and the like. Additionally, or alternatively, the data and/or information may be transferred to other slabs 10 in the vicinity or in the direction of travel of the vehicle.

It should also be noted that a benefit of one or more embodiments, while not required to practice the present inventive concept, is the possibility of providing multiple redundancies. For instance, multiple optical fiber sensor cables may be included and may permit operation, albeit with potentially reduced data resolution, even in the event one fails. Moreover, multiple sensor processors may redundantly include interrogators and/or electrical communication with the optical fiber sensor cables such that failure of a single sensor processor does not necessarily lead to loss of any output from the strain sensor array. In the same vein, multiple communication elements may also provide several data outputs (and, preferably, inputs) that may increase the longevity of each modular pavement slab by providing alternative access points in the event of a single communication element failure.

System and Methods

Figure 4:
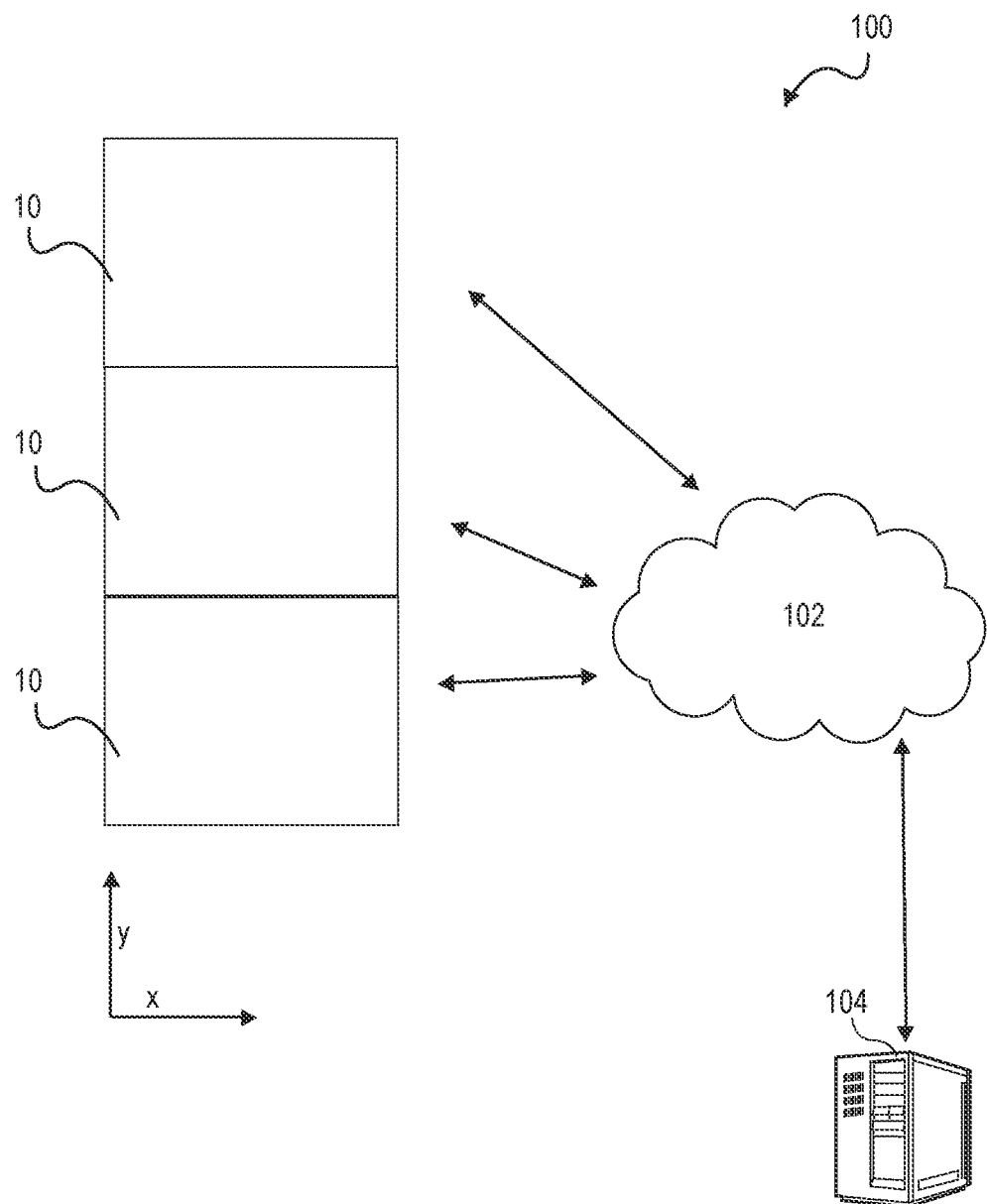
FIG. 4 illustrates various components, in block schematic form, of an exemplary self-monitoring modular pavement slab system in accordance with embodiments of the present invention.
Figure 5:
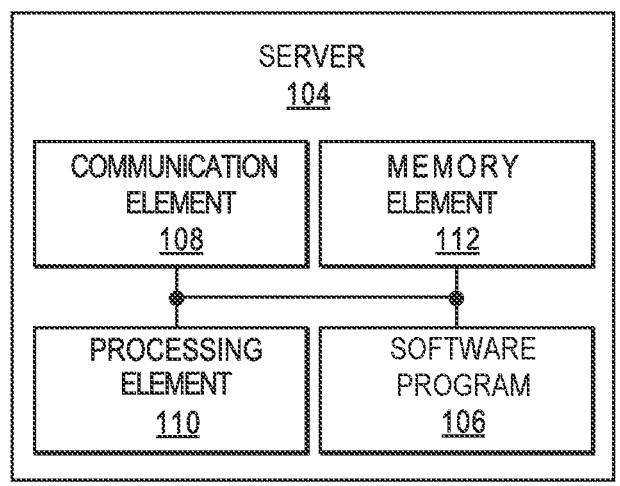
FIG. 5 illustrates various components of an exemplary server shown in block schematic form that may be used with the system of FIG. 4.

Turning now to FIGS. 4-5, an exemplary system 100 for utilizing slabs 10 is illustrated. The slabs 10 may be constructed substantially as described above and/or may be replaced with alternative embodiments such as those described in more detail below in connection with FIGS. 6-9. For instance, in one or more embodiments of the slab of FIGS. 6-9, signal processing, receivers, emitters and the opto-electronic interface may be housed with or adjacent to the server 104 (discussed below) instead of within the slab, and such components are in electronic communication with sensor grids in the slab via fiber optic cables. Digital to analog conversion, raw data processing, derivation and refinement may also occur at the server 104 instead of within the slab.

The system 100 includes a plurality of slabs 10 aligned in a longitudinal or "y" direction corresponding to a direction of travel of vehicles or other masses across top surfaces of the slabs 10. In an embodiment, load transferring connectors comprising dowel rods (not shown) join the slabs 10 to one another along sides extending perpendicular to the direction of travel (i.e., in the "x" direction). One of ordinary skill will appreciate that additional columns of slabs 10 (not shown) may be similarly constructed and arrayed on one or both sides of the illustrated column of slabs 10 in the "x" direction. Slabs 10 adjacent one another in the "x" direction may be joined using tie bars (not shown) or other load transferring connectors.

A communication network 102 may provide electronic communication between the slabs 10 and/or between the slabs 10 and a server 104. Moreover, the communication network 102 may provide electronic communication between the slab(s) 10 and/or server 104 and external computing systems. The external computing systems (not shown) may be controlled by third parties such as private or government actors desirous of receiving data, alerts and/or reports generated by the server 104 and described elsewhere herein. In an embodiment, communication elements of the slabs 10 comprise a portion of the communication network 102 and/or implement electronic communication between the slabs 10 and/or between the slabs 10 and the communication network 102.

The communication network 102 may include local area networks, metro area networks, wide area networks, cloud networks, the Internet, cellular networks, plain old telephone service (POTS) networks, and the like, or combinations thereof. The communication network 102 may be wired, wireless, or combinations thereof and may include components such as modems, gateways, switches, routers, hubs, access points, repeaters, towers, and the like. For example, the slabs 10 and/or the server 104 may generally connect to the communication network 102 using wired connections and/or wirelessly, such as by radio frequency (RF) communication using wireless standards such as cellular 2G, 3G, 4G, or 5G, Institute of Electrical and Electronics Engineers (IEEE) 802.11 standards such as WiFi, IEEE 802.16 standards such as WiMAX, Bluetooth®, or combinations thereof. In one or more embodiments, the communication network 102 is at least partly a wired network comprising fiber optic cables.

The server 104 generally retains electronic data and may respond to requests to retrieve data as well as to store data and/or perform computations. The server 104 may be embodied by one or more application servers, database servers, file servers, gaming servers, mail servers, print servers, web servers, or the like, or combinations thereof. Furthermore, the server 104 may include a plurality of servers (e.g., rack servers), virtual servers, or combinations thereof. The server 104 may be configured to include or execute software such as file storage applications, database applications, email or messaging applications, web server applications, or the like, in addition to and/or in conjunction with a software program 106. (See FIG. 5)

In an embodiment, the server 104 may include or comprise a front-access and/or standalone server, a network interface, and various databases including raw data and spatial mapping databases (not shown). The server 104 may comprise and/or be in electronic communication with an interrogator for electronic communication with fiber optic sensors and/or the communication network 102. Other conventional features, such as firewalls, load balancers, application servers, failover servers, site management tools, and so forth may also be utilized in conjunction with the server 104 but are not shown. The server 104 may apply methods or algorithms, may utilize lookup tables or databases, receive user input via one or more peripheral devices or associated systems, or perform tasks in connection with the steps outlined herein.

The server 104 may include a communication element 108, processing element 110, and memory element 112.

The communication element 108 generally allows communication with external systems or devices. The communication element 108 may include signal or data transmitting and receiving circuits, such as antennas, amplifiers, filters, mixers, oscillators, digital signal processors (DSPs), and the like. The communication element 108 may establish communication wirelessly by utilizing RF signals and/or data that comply with communication standards such as cellular 2G, 3G, 4G, or 5G, IEEE 802.11 standard such as WiFi, IEEE 802.16 standard such as WiMAX, Bluetooth™, or combinations thereof. Alternatively, or in addition, the communication element 108 may establish communication through connectors or couplers that receive metal conductor wires or cables which are compatible with networking technologies such as ethernet. The communication element 108 may also couple with optical fiber cables, e.g., via an interrogator. The communication element 108 may be in communication with or electronically coupled to memory element 112 and/or processing element 110.

Preferably the devices of the system 100 communicate via secure and/or encrypted communication means. For example, all or some of the server 104 and slabs 10 may securely exchange transmissions using DES, 3DES, AES-128 or AES-256 encryption and/or RSA (748/1024/2048 bit)

or ECDSA (256/384 bit) authentication. It is foreseen that any means for secure exchange may be utilized without departing from the spirit of the present invention.

The memory element 112 may include data storage components such as read-only memory (ROM), programmable ROM, erasable programmable ROM, random-access memory (RAM) such as static RAM (SRAM) or dynamic RAM (DRAM), cache memory, hard disks, floppy disks, optical disks, flash memory, thumb drives, USB ports, or the like, or combinations thereof. The memory element 112 may include, or may constitute, a "computer-readable medium." The memory element 112 may store the instructions, code, code segments, software, firmware, programs, applications, apps, services, daemons, or the like that are executed by the processing element 110. The memory element 112 may also store settings, data, documents, sound files, photographs, movies, images, databases, and the like.

The processing element 110 may include processors, microprocessors, microcontrollers, DSPs, field-programmable gate arrays (FPGAs), analog and/or digital application-specific integrated circuits (ASICs), or the like, or combinations thereof. The processing element 110 may include digital processing unit(s). The processing element 110 may generally execute, process, or run instructions, code, code segments, software, firmware, programs, applications, apps, processes, services, daemons, or the like. The processing element 110 may also include hardware components, such as finite-state machines, sequential and combinational logic, and other electronic circuits that may perform the functions necessary for the operation of embodiments of the present invention. The processing element 110 may be in communication with the other electronic components through serial or parallel links that include address busses, data busses, control lines, and the like.

Sensor Implementation(s)

Described below are exemplary configurations of sensor arrays in pavement slabs which may, for example, be implemented for traffic monitoring. Features of these exemplary configurations may be embodied by components and devices illustrated in any of FIGS. 1-14 herein, and more particularly by one or both of the slabs 10, 200 and associated components, and such features may be implemented in varying combinations and subsets without departing from the spirit of the present invention.

In one or more embodiments, a fiber optic sensor cable that contains one or more fiber sensing elements is embedded in a slab. One or both ends of the fiber cable terminate(s) at the edge of the slab at, in or adjacent to an edge connector (e.g., edge connector 50 of FIG. 2). The fiber path and shape of the cable may be chosen such that the ends reach the boundary of the pavement slab at a chosen location, such as the edge connector 50.

Terminating the fiber optic sensor cable(s) through a connectorized adapter such as the edge connector 50 enhances replaceability and serviceability of the modular slab, as discussed in more detail below.

The exemplary path of the cable through the sensing volume of the slab may be configured for minimal overall length and/or a minimal number of instances (e.g., zero (0)) where the cable crosses its own path (considered in an xy plane, and regardless of differences in depth along a z axis). The path of the cable also preferably does not include any bend radius small enough to generate significant signal losses from curvature of the fiber. In one or more embodiments, each bend radius of the cable is preferably at least twenty millimeters (20 mm or 0.787 in.). In one or more embodiments, each bend radius of the cable is more preferably at least two hundred and twenty-five millimeters (225 mm or 8.86 in.). In one or more embodiments, each bend radius of the cable is still more preferably at least five hundred millimeters (500 mm or 19.69 in.).

Wherever design constraints require an optical fiber cable to cross its own path in the manner described immediately above (that is, to intersect in a plane defined by the top surface of the pavement or slab), the path may be configured so that there is a vertical (z axis, perpendicular to the plane) separation between the crossing fiber segments (e.g., the minimum vertical separation being at least two-tenths of an inch (0.2 in.)), and the vertical separation may be filled by the material that constitutes the sensing volume or body of the system (i.e., by paving material). There should be such vertical separation between the cables to minimize undesirable interaction of forces between the cables. The path may additionally be configured to minimize the number of bends and degree of retracement, thereby simplifying routing and placement requirements for fabrication.

In one or more embodiments, each sensor 32 may be separated from its nearest neighbor sensor 32 along a width axis by at least four inches (4 in.), or at least six inches (6 in.), providing improved affordability, non-redundancy, and accurate detection. However, in one or more embodiments, a slab may be equipped for enhanced detection of transverse position and/or movement of passing objects by including sensors 32 separated from one another along the width axis by two to four inches (2-4 in.), inclusive.

In a slab (e.g., 10 or 200) that incorporates an internal reinforcement structure and/or geogrid material, the fiber routing path—and particularly segments including sensing elements or sensors—may run parallel and/or adjacent to the internal reinforcement structure and/or geogrid material. Moreover, the positions of the sensing elements or sensors and the longitudinal dimension of the corresponding sections of fiber cable may extend adjacent to (and/or in attachment with) and along and/or in alignment with corresponding sections of the reinforcement structure (e.g., rebar segments or the like).

Turning briefly to FIG. 16, geogrid materials are illustrated forming reinforcement layers 270 in various optional shapes and/or patterns. One of ordinary skill will appreciate that a reinforcement layer may take a number of shapes and/or patterns within the scope of the present invention. Moreover, the geogrid materials may include one or more of: polymeric materials, polypropylene (PP), high density polyethylene (HDPE) and polyester (PET). Where a fiber optic sensor cable is attached to a reinforcement layer comprising geogrid materials, such attachment may be formed during manufacturing of the corresponding precast slab(s). Moreover, such attachment may be made using tapes, adhesives or the like and/or fasteners such as clamps, ties or the like. Also or alternatively, the reinforcement layer(s) formed of geogrid materials may comprise apertures (e.g., comprising a mesh and/or hollowed structures) through which portions of the sensor array (e.g., fiber optic cable(s)) may be strung and/or may extend. One of ordinary skill will appreciate that such assemblies may omit the need for tapes, adhesives, fasteners or the like for securing the cable(s) to or within the reinforcement layer(s).

More particularly, in one or more embodiments the fiber optic sensor cable extends adjacent to and under a lower/lowest reinforcement or geogrid element (e.g., see elements 205 and 215 of FIG. 7), thereby amplifying sensing of the tensile and compression strains within the sensing volume(s) of the body 12, improving sensor signal level and sensitivity, and protecting the array from damage from vehicles passing along the upper surface of the slab.

Different types of materials may be used to adhere the fiber optic sensing element or cable to a portion of the slab, such as a paving medium or material or a reinforcement or geogrid structure. In one or more embodiments, the adhering material is selected to maximize coupling between an intended variable to be measured and the sensor's output. In one or more embodiments, selection of the adhering material, as well as the location of the fiber optic cable and/or sensing element, produces acceptable structural integrity and coupling between the sensing volume and the sensor. In one or more embodiments, the adhering material may comprise glue or other adhesive, a form of tape, a method of tying the sensing element or cable to the reinforcement, or the like. The attachment or adhered relationship may also be achieved through use of a mechanical fastener, such as a clip or shroud that seats the sensing element and/or cable against the reinforcement grid. In one or more embodiments, such a fastener may be removable and/or adjustable. In one or more embodiments, the adhering material does not interfere with operation of, nor cause damage to, the sensing element, the cable and/or the slab more generally. The routing path for the sensing element(s) and/or cable(s) may enhance signal communication within the sensor array and between the sensor array other components, for example by reducing interference, noise and/or undesirable damping of the signal(s).

It is, however, also foreseen that the sensor array and/or optical fiber cables may be adjacent to and/or on top of an upper reinforcement segment or layer, or alternatively positioned, without departing from the spirit of the present invention. It should be noted that this may increase risk of damage to the array from vehicles passing on the upper surface and/or may decrease the quality of sensor operation relative to configuration(s) described in the preceding paragraph or elsewhere herein. In a preferred embodiment, each fiber optic sensor cable is at least ten centimeters (10 cm or 3.94 in.) below the upper surface of the pavement slab. In one or more embodiments, each fiber optic sensor cable is between ten and fifteen centimeters (10-15 cm or 3.94-5.91 in.) below the upper surface of the pavement slab.

More broadly, in one or more embodiments, the path or routing of a fiber optic cable of a sensor array may be configured so that sensing element(s) of the cable are located proximate to or in those portion(s) of a slab's sensing volume that, responsive to objects moving across the slab's upper surface, induce the greatest amount of strain/deformation of the fiber optic cable and/or that otherwise maximize the variation in output of the sensing element(s) relative to other portion(s) of the sensing volume.

In one or more embodiments, an optical fiber cable or other sensor element housing or sheathing may include or comprise ruggedized coating(s) such as nylon. The coating(s) may help reduce impairment of the cable, housing and/or sheathing and/or the sensor element(s) housed therein. It is foreseen that certain such coating(s) may also impact operation of the sensing element(s), for example by impacting sensitivity, causing a need for an increased bend radius, or otherwise. Accordingly, it should be appreciated that physical and operational characteristics of the sensor array and associated components may be altered to accommodate such coating(s) in view of operational requirements and specifications, for example with respect to configuring sensing element placement, cable length(s), cable routing, and other utility concerns. It should also be noted that diameter and coating of a fiber optic may vary according to intended application without departing from the spirit of the invention.

A sensor array may include fiber optic cable(s) with one end terminating in the sensing volume (known as a "deadhead" configuration) of the corresponding slab and/or with two ends terminating outside of the sensing volume. Where two (2) ends of the cable exit the sensing volume/slab or terminate outside the volume/slab, those ends may be spliced into multiple connections within the sensing volume/slab, may extend beyond the sensing volume/slab, or may terminate at the edge of the sensing volume/slab at a connector, plug, or terminator element. One of ordinary skill will appreciate that a sensor array may comprise multiple such fiber optic cable(s), one or more of which may be a single-ended fiber operating in a dead-head mode, may be a multi-ended fiber where each end is spliced, may extend beyond the sensing volume/slab, may terminate at an edge of the sensing volume/slab, and may be configured based on a combination of these features within the sensing volume/slab, without departing from the spirit of the present invention.

Multiple fibers may enter or exit the sensing volume and/or slab proximate one another and/or as part of a multi-fiber cable. The fibers may terminate at a connector or terminator at or adjacent the edge of the sensing volume and/or slab, or may simply extend beyond the edge to a distal terminal. Such fibers may be routed individually and separately along different paths within the sensing volume and/or slab, covering different portions of the sensing volume. For example, a multi-fiber with a single connector may separate into four (4) fibers, with each fiber being routed to a unique or different path or pattern and/or a different position within the sensing volume and/or slab, returning data regarding separate physical regions of the sensing volume. It is foreseen that all or some such fibers may be two-ended or one-ended without departing from the spirit of the present invention.

The sensor array may include one or more multiplexed fibers. For example, multiple fibers may be spliced together into a single fiber path or cable, or the fibers may be separated into a multi-fiber system. Such multiplexing hubs may be inside or outside of the sensing volume and/or slab. For example, an external multiplexing hub may comprise two fibers jumpered between two separate sensing volumes and/or slabs. Moreover, multiplexing can be parallel or serial. A multiplexing hub may also comprise a jumper box or the like—which may be located at an intermediate point between corresponding sensing volumes and/or slabs—at which a plurality of fiber jumpers are collected. Such a collection point, jumper box or hub may also include means for manual or managed (e.g., through an active element) multiplexing modification to mux and demux the multiplexing automatically or programmatically.

The sensor array may be located and configured to maximize likelihood of accurate sensing and identification of vehicle tires on an upper surface of the sensing volume and/or slab. In one or more embodiments, configuration of the sensor array, and location and/or pattern of its constituent sensing elements and/or fiber(s), may depend at least partly on metrics (average, quartiles, etc.) relating to expected track width and weight of traffic at the location in question.

More particularly, the sensing elements of the array measure deformation of the sensing volume and/or slab, based on internal and external factors. Impermanent stress and strain transferred through the sensing volume and/or slab may be attributable to vehicles and other objects passing along an upper surface of the sensing volume and/or slab or near enough to induce such impermanent changes in stress and strain in the sensing volume. The sensor array may be positioned, patterned and otherwise configured to provide information regarding the sources, duration, and amplitude of the stress and strain signals that are propagated through the sensing volume or slab into the sensing elements or fiber(s).

Deformation of the sensing volume or slab caused by objects (e.g., vehicles) on the upper surface includes tensile and compressive deformation. The sensor array may be configured to provide accurate information regarding such objects by taking into account aspects of the objects, such as by considering metrics relating to expected weight distribution across tires, tire size, and tire pressure. In one or more embodiments, deformation may be represented along longitudinal (direction of travel), transverse (perpendicular to travel), and vertical dimensions or axes. The sensing elements of the sensor array may be oriented to capture important aspects along one or more of these three dimensions. Preferably, at least one sensing element within a sensing volume or slab is longitudinally oriented to enhance sensitivity to longitudinal deformation. It is noted, however, that such an orientation reduces the sensitivity of the sensing element along transverse and vertical axes relative to other possible configurations. In one or more embodiments, the sensing volume or slab additionally includes at least one sensing element oriented along one of the other two axes, enabling the sensor array to capture a fuller data set on deformation.

It should be noted that orienting a sensing element along an axis may depend on the physical characteristics of the array. For example, where fiber optic sensors, such as FBGs, are included in the array, orientation is driven by the orientation of the portion of the fiber or cable in the sensing volume or slab in which the sensing element is located. In the exemplary embodiments of FIGS. 1 and 2, sensors 32 are longitudinally oriented because the fiber optic sensor cables 33 travel in the direction of travel (the "y" direction) where the sensors 32 are positioned along the cable 33.

In a preferred embodiment the fiber optic sensors are oriented such that the probability of tire detection is maximized. As part of a roadway configured for a pre-determined orientation relative to a direction of travel for traffic, and to bear the weight of that travel according to pre-determined design characteristics, the sensing volume and/or slab may be configured so that the sensing elements (e.g., fiber optic sensors) are oriented in the direction of maximum deformation induced by the traffic. Such an orientation has been found to enhance sensitivity (and, therefore, likelihood of detection) in many applications. Moreover, vehicles on the upper surface of a sensing volume and/or slab (e.g., slabs 10, 200) generally cause higher deformation along the longitudinal axis than the transverse axis. Accordingly, the illustrated sensing elements or sensors 32 of FIGS. 1 and 2 are oriented longitudinally, in the direction of travel.

Sensing elements 32 may be sized for detection of one or more data types or applications of interest. For example, the fiber optic sensors 32 illustrated in FIGS. 1 and 2 include one or more sensors 32 configured to accurately detect (through sensing corresponding deformation(s) in the sensing volume or slab) vehicle tires passing along the upper surface 14. It has been observed that fiber optic sensors having a lesser length provide good spatial resolution for identifying relatively spatially localized deformations in the sensing volume or slab caused by corresponding vehicle tires. In one or more embodiments, the individual vehicle tire detection fiber optic sensor(s) 32 are less than fifty centimeters (50 cm or 19.69 in.) in length along the longitudinal axis of the corresponding cable 33. Each sensor 32 is preferably at least one half of a centimeter long (0.5 cm or 0.2 in.), along the longitudinal axis of the corresponding cable(s) 33, to enable accurate sensing in pavement application(s). In one or more embodiments, e.g., where cables 33 comprise sensors 32 other than FBG sensors, the size of the sensors 32 may be stated alternatively and more indirectly in terms of spatial resolution. More particularly, in one or more embodiments, the sensor array 34 may comprise sensors 32 having a spatial resolution of between one half of a centimeter long (0.5 cm or 0.2 in.) and fifty centimeters (50 cm or 19.69 in.) as measured along an axis of the slab 10 (e.g., along a length or direction of travel, or along a perpendicular width). Such sensors 32 are configured to distinguish individual tires and avoid counting two (2) tires as one (1), and are particularly important for detecting heavier vehicles with smaller wheelbase and track width. Spatial resolution refers to the minimum distance along the fiber cable 33 where an independent measurement can be done. In one or more embodiments, e.g., where cables 33 comprise sensors 32 other than FBG sensors, the spatial resolution may be limited/defined/restricted by the interrogator capabilities and/or settings. A higher sensor resolution means a higher number of distinct measurement points along the fiber cable 33 with a given length. Higher spatial resolution requires higher processing rate as the frequency of the light signal increases.

In one or more embodiments, larger sensors 35 (also referred to as "integrity sensors")—for example, measuring between fifty and one hundred centimeters (50-100 cm or 19.69-39.37 in.) along the longitudinal axis of the corresponding cable(s)—may be utilized to identify features such as large crack(s) in the sensing volume or slab. In one or more embodiments, the larger sensors 35 may have a physical length and/or a spatial resolution of between fifty and one hundred centimeters (50-100 cm or 19.69-39.37 in.). Such larger sensors 35 (e.g., degradation-strain sensors) may be embedded within the same sensing volume or slab as the smaller sensors 32 (e.g., vehicle-strain sensors) for better combined monitoring of vehicle tires and crack(s). Moreover, one of ordinary skill will appreciate that the larger sensor(s) 35 may be oriented other than along the direction of travel, and may extend for up to approximately two meters (2 m) along the longitudinal axis of the corresponding cable(s) (and/or have a spatial resolution of up to two meters (2 m)), without departing from the spirit of the present invention.

Sensing elements or sensors of a fiber optic cable—e.g., FBG sensors-should be separated by at least one centimeter (1 cm or 0.39 in.), and more preferably by between ten centimeters and five meters (10 cm-5 m or 3.94-196.85 in.). Shorter distances than one centimeter (1 cm) between the sensors may lead to improper manufacturing of the sensors. The space may compensate potential uncertainty of the sensor fabrication process. In one or more embodiments, two (2) or more sensors of a fiber optic cable may be located on a single length of substantially straight cable (i.e., between two bends). In this sense, the straight length need not be perfectly, only substantially, straight, such as where any deviations from linearity do not substantially degrade the quality of sensing realized by the array.

Moreover, it should be noted that light in an optical fiber cable incurs macro-bending and micro-bending losses due to cable bending. Placing a sensing element such as an FBG sensor on a bent section of cable may disrupt the uniformity of the sensor shape, hence disrupt the reflective nature of the grating due to uneven spacing. This may lead to undesirable effects in the signal leading to less accurate measurements. In a preferred embodiment, the sensors 32 are positioned along straight or mostly straight portions of the cable(s) 33, so that there is no significant impairment of the signal. In a preferred embodiment, each sensor 32 is separated from the nearest curved portion of the corresponding cable 33 by a minimum distance. For example, one or more of the sensors 32 may be at least twenty inches (20 in.) from the nearest curvature of the corresponding cable 33. In one or more embodiments, the minimum separation from the nearest curvature may be at least fifteen inches (15 in.). In still other embodiments, the minimum separation from the nearest curvature may be at least three inches (3 in.). In still other embodiments, the minimum separation from the nearest curve may be at least one centimeter (1 cm or 0.39 in.).

In one or more embodiments, each sensor 32 is configured to operate at a sampling rate that is either equal to or higher than the Nyquist rate for the strain fluctuations in the region of the sensing volume that is being sampled by the sensor 32. The Nyquist rate is the rate that is two times the frequency of a signal that is desired to be sampled. One corollary of the principle is that a signal with a higher frequency or faster rate of occurrence will require a higher frequency sampling rate than lower frequency or slower occurring signals.

Accordingly, where a sensor 32 is configured to sense a particular aspect of deformation of a region of the sensing volume surrounding it over time, various characteristics of that aspect and sensing volume may inform the required configuration and sampling rate. For example, where vehicles' tire locations, weights and related aspects of the vehicles are to be tracked, configuration of the corresponding sensor 32 may be based on metric(s) (e.g., anticipated average) representative of expected vehicle speed, weight, weight distribution, or the like. One of ordinary skill will appreciate that other aspects of the expected vehicle population movement, weight or the like, and/or of the sensing volume, slab, pavement and/or roadway itself, may also be taken into account when configuring a sampling rate for each sensor 32.

Each sensor 32 has an approximate sensing area or region of the sensing volume that is expected to influence the sensor's 32 readings appreciably with respect to the variable(s) it is configured to track. In one or more embodiments, a sensor may be thought of as being "assigned" to such a region of the sensing volume. Further, in one or more embodiments, the "sensing volume" may be coextensive with the sum of all such regions assigned to any sensor of a single sensor array. However, in one or more embodiments in which the sensing volume comprises a pre-cast modular slab (e.g., with load transferring connectors attached to at least one surrounding structure), and/or in the case of cast-in-place concrete installations (e.g., with saw cuts delineating the segments), the "sensing volume" make also or alternatively refer to the volume inside the defined boundaries defined by the sides, top and bottom of such a slab or cast-in-place concrete installation.

In one or more embodiments, the sides of a segment of roadway or slab correspond to the precast sides of a precast slab or, in the case of a cast-in-place segment, to the saw cut joints along a first axis, and to the borders with adjacent lane(s) or shoulder areas of the road (as the case may be) along a second axis perpendicular to the first. In one or more embodiments, the sides of a segment of roadway (e.g., continuous pour roadway) may correspond to opposite limits of a sensing volume along a first axis that are monitored by a single sensor array (i.e., an array that shares a common light signal, regardless of the number of splices/branches, and/or a common interrogator or sensor processor, somewhere along the cable(s)), and to the borders with adjacent lane(s) or shoulder areas of the road (as the case may be) along a second axis perpendicular to the first.

It should be noted that the area falling within the region of the sensing volume of each of the sensors 32 may vary with each such sensor's 32 size and resolution. Further, the signal sensed by the sensor 32 may be significantly modulated by the characteristics of the surrounding material and structure (or sensing volume), and such influence on the signal should be considered to determine the sensor's 32 sampling rate.

Still further, various characteristics of the source of the signal that is being monitored impact the characteristics of the signal that is received by the sensing element within the sensing region, thereby requiring attention when configuring the sensing element. These characteristics must also be considered as variable, within certain limits, across the various vehicles comprising the traffic the sensing element will be tracking over its lifetime. For instance, in one or more embodiments a sensing element will be configured for sensing vehicles traveling within one or more speed range(s), considering the location and usage characteristics of the roadway in question (e.g., highway vs. feeder), vehicles falling within one or more pre-defined ranges for vehicle weight and/or weight distribution across a varying number of tires, and vehicles falling within other pre-defined categories relevant to sensing element configuration.

For example, a vehicle with a slower speed at a given weight, and a given weight distribution across its tires, may cause a signal with relatively lower frequency than a second vehicle with the same weight and weight distribution across its tires but traveling at a higher speed. Similarly, a heavier vehicle traveling at a given speed may cause a signal with relatively lower frequency than another vehicle with lower weight traveling at the same speed. Moreover, a vehicle's suspension and suspension response to the upper surface of the sensing volume or slab may also impact collection of readings by a sensing element. For example, for a vehicle that is bouncing on its suspension, a lower relative weight reading may be had at the apex of the bounce because of the vertical momentum of the vehicle, while at the bottom of the suspension travel the opposite vertical momentum of the vehicle may result in a greater relative weight reading.

Modeling the populations of vehicles expected to comprise the traffic across a particular segment of roadway—including with respect to the aforementioned characteristics—may support configuration of the sensing elements. Accordingly, and for example, pavement sensing elements or sensors for a highway segment with a higher speed limit and a significant population of large truck traffic may be configured with a different sampling rate than a suburban residential segment with a lower speed limit, a maximum vehicle limit, and less large truck traffic.

In a preferred embodiment, the sampling rate (operating rate) of the sensor processor corresponding to a sensing element is at least five hundred Hertz (500 Hz) when used to detect or track the movement of and/or to otherwise identify vehicles. In one or more embodiments, such a sampling rate is effective for sensing lighter vehicles on roadways with higher speed limits. One of ordinary skill will appreciate that higher sampling rates—such as five or ten kilohertz (5 or 10 kHz) may also or alternatively be utilized. However, it should be noted that such higher sampling rates may require larger or more robust system memory elements (e.g., element 42), because the number of data points is likely to increase and suffer from worse resolution. For longer sensors 35, for example, the sampling rate may be less than two hundred Hertz (200 Hz) and, more preferably, between approximately twenty microhertz (20 µHz) and two Hertz (2 Hz), particularly where primarily implemented for pavement condition indexing and/or crack detection.

The resolution of each sensor 32 depends at least in part on the sensor processor 38 and interrogator 48. For example, the higher rate at which a sensor processor operates, the worse the resolution becomes. Here, if a degree of deformation is not significant enough in the region of the sensing volume corresponding to a sensor 32, in view of the resolution of the sensor 32, the sensor processor 38 may not detect the vehicle. In a more particular example, a vehicle's weight and movement across the upper surface of the sensing volume or slab may cause deformation in the corresponding region of the sensing volume giving rise to a one-half picometer (0.5) picometer shift in the output of the sensor 32, where the resolution of the sensor processor 38 is one (1) picometer. The exemplary vehicle may not be detected, because the shift in the output is smaller than the uncertainty of the sensor processor 38.

It should be noted that the resolution value of the sensor processor 38 may be translated into a representative variation value in the deformation/strain being measured. In an embodiment with sensors 32 comprising FBGs, the sensor processor 38 may have a resolution of one to ten (1-10) picometers, which may translate to resolution of between eight tenths and eight (0.8-8) microstrains for a single mode fiber optic cable 33.

Each tire of a vehicle moving along the upper surface of the sensing volume or slab may cause deformation levels as low as, for example, one (1) microstrain in the region(s) of the sensing volume under measurement. In a preferred embodiment, the sensor processor 38 has resolution of minimum one (1) picometer (e.g., eight tenths (0.8) of a microstrain) to increase a likelihood of tire detection. Such configurations may be particularly effective when detecting the presence of lighter-weight vehicles. A preferred embodiment with one (1) picometer resolution can weigh tires in approximately three hundred pound (300 lb.) increments, providing a weighing system accuracy of +/−5% for a 3-ton vehicle and +/−1% for a 40-ton vehicle.

Consequent to these considerations, it may be preferable for the sensing system to have the ability to modify the system's sampling rates and resolution to optimize the system's capability to measure different signal characteristics from different sources. For example, in one or more embodiments, the interrogator 48 may include a drop down button, and may be configured to modify the scanning rate and resolution of the sensor(s) based on traffic speed to optimize data quality while avoiding over-collection of data from the array 34. The adjustment to scanning rate and resolution may, in one or more embodiments, be performed simultaneously for all sensors 32 of the array 34. Generally, in one or more embodiments arrays 34 embedded in highway pavement may be tuned to greater scanning rates, and those embedded in city road or other lower-speed segments may be tuned to lower scanning rates. In one or more embodiments, tuning may be dynamic, such as where vehicle speed is sampled by the array 34 and/or other sensing means, and an algorithm determines one or more preferred scanning rate(s) for the corresponding pavement segment in view of the factors outlined here.

Computer-Implemented Methods

Described below are steps of exemplary computer-implemented methods for utilizing the system components of embodiments of the present invention. Some steps may be performed concurrently as opposed to sequentially, and may in some cases be performed in a different order. In addition, some steps may be optional. The computer-implemented methods may be executed by exemplary devices and components introduced with the embodiments illustrated in FIGS. 1-14 in any combination. For example, the steps of the computer-implemented methods may be performed by slabs 10 and/or slabs 200 described in connection with FIGS. 6-9 below (with or without communication ports 50 which may comprise and/or be replaced with one or more edge connectors 226 described in connection with FIGS. 10-13 below) through the utilization of processors, transceivers, hardware, software (such as the software application 106), firmware, or combinations thereof. However, a person having ordinary skill will appreciate that responsibility for all or some of such actions may be distributed differently among such devices or other computing devices without departing from the spirit of the present invention. For example, steps described in connection with the computer-implemented methods outlined below may be performed by the processing element 110 alone or in combination with processing element(s) 44, and software program 106 may be executed by any combination of the foregoing and/or other computing devices. One or more computer-readable medium(s) may also be provided. The computer-readable medium(s) may include one or more executable programs, such as the software program 106, stored thereon, wherein the program(s) instruct one or more processing elements to perform all or certain of the steps outlined herein. The program(s) stored on the computer-readable medium(s) may instruct the processing element(s) to perform additional, fewer, or alternative actions, including those discussed elsewhere herein.

In an embodiment, the software program 106 includes one or more algorithm(s) trained (e.g., via machine learning techniques) or otherwise configured to perform computations, calculations, identification operations, classification operations and similar computations on sensor data input, as outlined in more detail below. In one or more embodiments, analysis of the sensor may be according to one or more other algorithms or rules configured to perform one or more classification operations. For example, the algorithms and/or rules may optionally be implemented in conjunction with and/or through execution of a machine learning program. The machine learning program may include curve fitting, regression model builders, convolutional or deep learning neural networks, Bayesian machine learning techniques, or the like. The machine learning program may identify patterns in data sets to help generate the one or more classifications. The machine learning program may be trained using supervised, unsupervised and/or reinforced machine learning processes without departing from the spirit of the present invention.

It should also be noted that sensor data generation, and corresponding computations, calculations, identification operations, classification operations and similar computations on the sensor data input may be performed automatically and/or with manual input, and resulting alerts and other transmissions (e.g., to third party computing systems) may likewise be triggered automatically and/or manually within the scope of the present invention.

Slabs according to embodiments of the present invention may include fiber optic sensor arrays (such as arrays 34 and/or FOSS loops 215, 216 shown in FIGS. 6-9) that provide for the sensing of continuous strain values across a range of outputs. Combination of multiple sensors on an array in a single paving slab (or "unit"), with each sensor reading a continuous value across a range, permits integration of data across multiple sensors, as well as multiple paving units. By integrating multiple continuous values in a single paving unit or across multiple paving units, a system including those units may provide high strain-resolution readings for each sensor, high time-resolution for each strain reading, and high spatial resolution for the collected strain and time readings. The combination of such features turns an individual paving unit, or multiple joined paving units, into a system that may perform analogously to a touch-screen on a mobile device, though of course the paving units in question take readings sensing tire or other load positions rather than finger positions.

Preferred paving units generate multi-axial high-resolution output across strain, time, and space, and the output data can be integrated and analyzed to produce significant derivative readings that may not be obtained from the implementation of a single sensor, an array of sensors in a single unit, or an array of units with singular or multiple sensors. These derivative readings may require significant and complicated software analytics to implement in a reliable fashion across multiple sensors and multiple units, including but not limited to wherever the derivation comprises an accurate, precise, transient, localized strain reading from a raw data signal that includes multiple complicating factors such as transient thermal noise, vibrations from adjacent but indirect vehicle, equipment, or pedestrian presences, and the internal strain environment of a relaxed system with no external strain source present.

Embodiments of the present invention may implement complex processing algorithms to reduce, clean, and order datasets generated by sensing elements of the paving units and/or to remove undesirable signal components. Such error-corrected structured strain data can be compared between multiple time and space readings from multiple sensors to identify congruencies between the individual readings against a variable spatial offset, time offset, or strain value offset. The spatial offset can be relative or absolute, abstract or specific depending on the desired application. The time offset can be relative or absolute, abstract or specific as well, but presumably the time offset will be identified using standard time measuring methods, such as universal time coordinates, "Unix time," synchronization with a time server, global positioning system (GPS), or some other accurate, available, and accepted method for measuring time.

It should also be noted that much of the description herein focuses on a load applied by a vehicle overlying slab(s) of embodiments of the present invention. One of ordinary skill will appreciate, however, that vehicles are utilized herein as an example for ease of reference. It is foreseen that other dynamic (e.g., moving) objects and loads may be measured in addition to or in place of vehicles without departing from the spirit of the present invention. For example, speed, dimensional, weight distribution and other classification operations described below in connection with vehicles may be performed with minimal modification in connection with classification of pedestrians or other animals (e.g., where each foot or the like takes the place of vehicle tire).

Vehicle Dimensions, Motion, and Identification

An exemplary grid of sensors may be embedded in a paving unit or group of paving units, wherein the direction of load (e.g., vehicle) travel over the unit(s) is along a Y-axis, a lateral pavement direction is along an X-axis, and a time dimension is signified by a T-axis. Comparison of cleansed, structured strain data from multiple of the sensors that are aligned along the X-axis can register the presence of a tire, then compare the signal or data to other of the sensors with an offset (difference, differential, change, etc.) in the X, Y, or T dimension. Through the comparison of these readings from multiple offset sensors, the individual sensation of a singular tire can be correlated with confidence to one or more other signal(s) or data set(s) respectively corresponding to one or more other loads (e.g., one or more other tire(s)) across the respective dimensions. This method enables, for example, the derivation of not just a single tire sensation, but of a grouping consisting of two or more tires conjoined across an axle, with the axle representing a fixed spatial offset in the X-dimension.

By further analyzing the T-dimension in connection with, for example, axle detection, the sensor grid can identify the direction of travel of the axle and of the vehicle to which it is attached. This direction of travel derivation can be calculated, e.g., by a server of embodiments of the present invention, and utilized in a number of applications, such as where a signaling system uses the derivation to generate an alert when a vehicle is traveling in the wrong direction, for example when a vehicle enters roadway, highway, interstate, or other type of roadway traveling in the wrong lane. Further, such a signaling system may pass on alerts to any parties that may need or wish to receive said alert, including an owner of the vehicle or asset such as a municipality or DOT, respective management facilities and personnel such as a Traffic Management Center, Traffic Operations Center, Traffic Systems Management and Operation, or emergency services such as police, highway patrol, state troopers, or other persons who may wish to respond to intercede with respect to the vehicle traveling in the wrong direction.

By analyzing the T-dimension of data gathered from a singular axle passing over multiple sensors oriented along the X-axis, and comparing it T-offset from its original detection to the detection by a second set of sensors oriented with a Y-offset, a time delta can be used to derive an estimated vehicle speed. Once the initial time delta is derived for vehicle speed, the aforementioned set of sensors oriented along the X-axis may register detection of the vehicle's second axle using the same method as for the first axle to derive the axle width of the second axle. Comparing the second axle detection to the vehicle's speed allows derivation of the distance between n and n+1 axle positions of the vehicle. This provides a track length between adjacent axles of a vehicle. In summary, analysis of X, Y, and T dimensions of sensor detection may provide the first axle width, the vehicle speed, the second axle width, and the track length(s) of the vehicle.

Based at least in part on the original axle X-axis offset of the first axle, the second axle X-axis offset of the second axle, and the track width, the fiber optic sensor array (and/or a server or other processing element in communication therewith) may derive presumptive dimensions of the vehicle (e.g., with some margin of error). These dimensions may be used to categorize the vehicle into one or more vehicle categories and/or subcategories, for example as defined by existing industry and regulatory vehicle categorization methods.

Through integration of external data sources such as tables containing the dimensions of multiple vehicle makes and/or models, dimensions derived from the sensor system and methods outlined herein may be used to assign a probability that a detected vehicle is a specific make and model of vehicle, and may estimate a production year range. As some combinations of make, model and production year range may respectively include vehicle types having different track widths and track lengths—for example long-bed, extended-cab, or dually trucks—make and model detection according to embodiments of the present invention may extended to identify specific trim levels and options packages.

Weigh-in-Motion (WIM)

Recalling the discussion above regarding continuous reading of strain values across a range of outputs, it should also be noted that a system according to embodiments of the present invention may incorporate one or more algorithms trained (e.g., using machine learning) or otherwise configured based on known values (e.g., weights) for vehicles. Such algorithm(s) may be configured to correlate specific strain value(s) from one or more sensor(s) to a weight or imposed mass, with a high degree of precision and accuracy. Such algorithm(s) may form the foundation for improved WIM systems of embodiments of the present invention.

Most existing WIM systems consist of a strain gauge comprising a single strip laid into a groove or cut in pavement. As a single strip, such existing systems rely on the accuracy of a singular weighing event as each axle passes over the strip. In comparison, embodiments of the present invention utilize at least one embedded array of sensors. The array(s) provide the opportunity to weigh vehicles repeatedly and continuously as they move across the grid formed by the array(s). By repeating the weighing process multiple times as the vehicle moves across a single slab and/or across multiple slabs, the system according to embodiments of the present invention may remove outlying readings (e.g., that deviate from a pre-determined range), for example where readings above and/or below a range are removed or screened from further calculations and/or consideration.

It should be noted that sensed loads may vary as a vehicle or other load travels across pavement. For example, a vehicle may bounce on its suspension as it travels from one point to another. This can result in an erroneously low reading if an existing sensor takes readings as the vehicle is elevated on its suspension, or an erroneously high reading if an existing sensor takes readings as the vehicle's mass rebounds into the suspension. These errors are inherent in the conservation of momentum and the vehicle's inertia across a rough surface as its suspension moves. With a single pass of readings from a traditional WIM system, it can be difficult or impossible to remove momentous or inertial errors imposed by vehicle's vertical motion, or errors imposed by braking or accelerating across the sensor.

In comparison, embodiments of the present invention may read strain values across a grid multiple times or continuously across a single pavement slab or across multiple slabs joined by load transfer devices or connectors. An algorithm trained (e.g., via machine learning) or otherwise configured to perform calculations on raw sensor data received from the grid may correct for, filter and/or sort out any extraneous readings imposed, for example, by such momentous or inertial errors imposed by vehicle's vertical motion, or errors imposed by braking or accelerating. Such error correction may comprise or be assisted through the use of such grid(s) of sensors because such error-inducing motion of the vehicle may be transient and/or may lead to readings which essentially cancel each other out due to the conservation of momentum (e.g., if an algorithm utilizing averages or the like is used to interpret sensor data). Thus, in embodiments of the present invention such erroneous values may be observed as outliers and discarded, or integrated across a mean, median, or mode functionality to improve the accuracy of the reading.

Sensor grids according to embodiments of the present invention may comprise multiple sensors within a single, continuous, unit or cable. Further, one or more sensor grids—capable of correcting for measurement error(s) described above—may further be embedded within a single slab. Readings taken from the single slab may further reduce such error(s) because the multiple distributed readings may nonetheless be taken as a vehicle travels across the single slab because it is less likely to encounter an obstacle (such as a junction between slabs) which might cause bounce, braking or other such sources of measurement error. Thus, the readings for a sensor array embedded in a single paving unit may provide a fundamentally more accurate reading by eliminating extraneous signal components.

Other advantages of embodiments of the present invention relate to minimizing damage to embedded sensor array(s) from outside causes. An existing WIM system sensor is placed within a groove or cut in pavement, and is subject to debris intrusion that can damage or disrupt the sensor's operation. Further, under certain conditions, an existing WIM sensor can delaminate from the groove or cut and be pulled out. Still further, pavement maintenance crews may be assigned to use tar or other joint sealant materials to fill cracks in the pavement, and will inadvertently destroy an existing WIM sensor by filling the groove or cut in which it resides. In contrast, the sensor grid(s) of preferred embodiments of the present invention are embedded in the body of pavement slab(s), and are accordingly defended from debris intrusion, delamination, or application of joint sealant.

Other advantages of embodiments of the present invention are also apparent from comparison to existing WIM systems. For example, an exemplary existing WIM system comprising a weigh station may be placed along a long-haul span of interstate. Being knowledgeable of the most likely location of such weigh stations, commercial vehicles may move illegal loads (e.g., those in excess of maximum regulated weight) short distances within a city, whether on a street or interstate, so as to avoid weight stations intended to prevent such behaviors. In a more particular example, garbage trucks may move garbage comprising overweight loads from facilities within a city to a dump outside the city along routes that lack weight stations. This behavior accelerates deterioration of roadways, interstates, bridges, and so forth, but existing systems and methods do not have sufficient capability to detect and control these behaviors.

In contrast, embodiments of the present invention include precast pavement slabs with embedded sensor arrays that may be utilized along a greater variety of roadways and for a wider array of applications, making it exceedingly difficult for excessive or otherwise unlawful loads to go undetected. Moreover, algorithms of embodiments of the present invention may arbitrarily manage such sensor array(s) or grid(s) to improve the control of heavy traffic, and in doing so reduce deterioration of roadways and the corresponding maintenance costs for fixing damage. Also, embodiments of the present invention may be configured to utilize raw data from the embedded sensor grids for a wide variety of purposes, including WIM applications.

Another example that illustrates advantages of systems according to embodiments of the present invention relates to operational variances of vehicles. That is, a vehicle may have varying operational weights corresponding to changes in operational status, such as the presence or absence of passengers or fuel, and/or the presence or absence of oil, brake fluid, washer fluid, or any of the other myriad fluids that may or may not be within or carried by the vehicle. Existing WIM systems do not account for such variances (e.g., due to oil, brake, or washer fluid fill levels), though the vehicle weight will vary significantly based thereon (e.g., variances such as the level of its fuel tank, and the weight of individual passengers within the vehicle).

In contrast, systems according to embodiments of the present invention offer grid(s) of sensor arrays distributed across a slab and/or across multiple slabs joined with load transferring devices or connectors. Resultant weight readings are comparatively continuous, reading weight substantially as a continuous value along all or a portion of such arrays. Moreover, embodiments of the present invention include algorithms trained (e.g., via machine learning) or otherwise configured to correlate sensor data and readings corresponding to a single vehicle across time and space. Thus, embodiments of the present invention are configured to calculate, detect and/or identify variation in vehicle weight not only attributable to unwanted bouncing or braking or the like (discussed above), but also attributable to the consumption of fuel or other fluids within the vehicle, addition or loss of a passenger from the vehicle, or to other such variances in operational status. For example, the algorithm may be trained or otherwise configured to interpret the sensor array data corresponding to a single data to adjust for a steady decline in weight attributable to fuel consumption. Moreover, these calculations may take into account expected fuel consumption retrieved from data tables once make, model and/or other attributes of the vehicle are identified within acceptable error. Likewise, the algorithm may be trained or otherwise configured to identify other recognizable weight changes, for example resulting from refueling actions and/or receipt or emission of passengers, materials, or any other objects that may be loaded into or out of the vehicle.

Moreover, returning briefly to discussion above on the generation of alerts based on sensor data by systems according to embodiments of the present invention, it should be noted that such WIM systems may be configured to provide vehicle weight information to entities such as the TMC, TOC, TSMO, police, or other emergency services as part of weigh-station requirements and implementation of maximum weight regulations imposed by states and cities to manage commercial traffic loads on their roadways and direct those loads to vehicles designed to handle said loads.

Weight Distribution and Management

A vehicle's weight is distributed in some manner across the tires it rests on, and summing the weight across those tires generally provides the total weight of the static vehicle. Sensor grids of systems according to embodiments of the present invention may weigh each tire of a vehicle continuously, and may calculate the weight of the vehicle by summing the weight imposed by all of the tires.

Nonetheless, the continuous weight sensing of sensor grids of embodiments of the present invention may permit sensing of the individual weight loads applied by each tire of a vehicle. Thus, embodiments of the present invention provide the opportunity to register not only a vehicle's weight, but also its weight distribution.

Supplementing the discussion above regarding classification and categorization of vehicles based on dimensions, algorithms according to embodiments of the present invention may be trained (e.g., via machine learning) and/or otherwise configured to consider a vehicle's weight distribution sensed by the sensor grid(s) of one or more slabs during classification and categorization to improve accuracy. For example, front-wheel-drive front-engine vehicles tend to have a different weight distribution than rear-wheel-drive front-engine vehicles. This difference is also observed with rear-wheel-drive mid-engine vehicles, rear-wheel-drive rear-engine vehicles, all-wheel-drive front engine vehicles, and any other combination that may be present. In addition, when a truck has a load in its rear, the overall weight of the vehicle changes, as does the weight distribution across each axle and tire. Sensor grids within a pavement unit or slab, or across multiple units or slabs joined with load transferring devices or connectors, provide continuous load sensing enabling algorithms of embodiments of the present invention to use such sensor data in the form of weight distribution input to improve vehicle classification.

In an embodiment, recognition of weight distribution may help in classification of loaded vehicles of many types, including but not limited to commercial transportation loads, the loading of persons into transit vehicles, and the weight distribution of a trailer load. With respect to trailer load more specifically, it is well known that loading a trailer towards its back end creates an unsafe handling condition, and that a trailer is safer when loaded towards the tongue or evenly across the axle. Improved sensor grids outlined herein in connection with embodiments of the present invention may generate sensor data permitting determination of such unsafe weight distribution and loading conditions and, in turn, may generate alerts or the like for distribution to entities such as TMC, TOC, TSMO, police, and other emergency services.

Demographic Profiles

In embodiments of the present invention, one or more of the computations and classification operations described above and elsewhere herein—performed based at least in part on sensor data from one or more sensor grids distributed across a single precast slab and/or across multiple precast slabs joined by load transfer devices or connectors—may have generated derived or refined data reflecting a vehicle's dimension(s), weight(s), and weight distribution(s). As noted above, analog to digital conversion and interpretation of the sensor data and performance of such computation and classification operations may occur at any combination of sensor processor(s) embedded in the slab(s), the server(s) in electronic communication with the slab(s) and/or other computing devices in communication with the slab(s) and/or the server(s). Moreover, computation and classification operations (e.g., for determining make, model, trim level, and production year range of sensed vehicle(s)) may rely at least in part on accessing one or more database(s) storing standardized vehicle characteristics (e.g., vehicle dimensions, weight distribution etc.) for training classification algorithm(s) and/or comparison against corresponding sensor data and derived data relating to sensed vehicles.

Moreover, such derived data (and, possibly, raw data) may be transmitted to and/or stored by a computer system including a server in electronic communication with the slab(s) (e.g., server 104). The computer system may also generate alerts configured as transmissions to one or more external computer systems controlled by third parties, as outlined elsewhere herein.

Additional data may be received and/or stored by the computer system and/or database(s) accessed in connection with performing computation and/or classification operations in connection with sensed vehicles or other objects. For example, the additional data may be used to improve the accuracy and utility of embodiments of the present invention. For example, the computer system may periodically or continuously receive registration records from one or more departments or offices of motor vehicles (OMVs) including data relating vehicle owner(s) to owned vehicles. The registration records may include data relating to one or more of: vehicle makes, models, production years, and trim levels.

The registration records may also include demographic data relating to one or more characteristics of the owner(s), such as: height, weight, familial relations, age, residence or the like. Linking owned vehicle data to owner demographic data may provide, for example, additional variables and/or latent variables for use as input to trained classification algorithm(s) and/or additional points for comparison against sensed data and/or sensed data patterns to assist in other classification operations, as discussed in more detail below.

In one or more embodiments of the present invention, demographic data collection may be enhanced by integrating data from multiple OMV registration sources, for example across multiple states. Also or alternatively, a computer system according to embodiments of the present invention may limit training datasets for supervised machine learning of a classification algorithm by geographic location. For example, the computer system may segment available OMV data for use in training a classification algorithm according to distance from a sensed object. As the demographics of vehicle ownership can change across regions, cities, states, nations, and other geographic areas due to a multitude of factors, geofencing OMV record comparisons or training data sets for make and model ownership can further improve the accuracy of classification operations for demographic detection based on identifying the type of vehicle.

In an embodiment, the system may train multiple instances of a classification algorithm (or multiple classification algorithms) for use in different geographic regions. More particularly, a classification algorithm may be "assigned" or used in classification operations for sensor data generated by slabs within a particular geographic region, and OMV records including vehicles registered to addresses within the particular geographic region may be more heavily weighted or exclusively used for training that classification algorithm. This may improve classification accuracy wherever localized behaviors, vehicle design or modification (e.g., customization within particular regions), individual behaviors (e.g., carpooling is prevalent or not) or other vehicle or demographic variances may impact classification operations.

Dimensionality reduction and other techniques may be used to identify the most meaningful vehicle and demographic data available in OMV records for input to classification algorithms assigned to regions of different sizes. Optimal region size(s) (e.g., hexagonally shaped regions covering one hundred (100) square miles) and data set variables or elements may be identified. Moreover, one of ordinary skill will recognize that optimal region shape(s) may be determined, taking into account, for example, the varying shapes of population centers and demographic heterogeneities across regions.

One of ordinary skill will also appreciate that such regions may overlap, resulting in multiple classification outputs for a single vehicle being generated by multiple corresponding classification algorithms covering different but overlapping geographic regions. In such scenarios, the computer system may utilize overarching logic to combine or select the best from among the multiple classification outputs (e.g., using decision tree(s) for resolving the best of the available classification outputs).

OMV records and corresponding demographic profiles may be integrated or combined with additional data sources to support such classification operations. For example, databases of computer systems of embodiments of the present invention may store all or part of census records reflecting additional useful data about potential vehicle owners, such as income level, education level, marriage status, family size, and so on. Additionally or alternatively, databases of computer systems of embodiments of the present invention may store all or part of data sets available from social media sources providing other data about potential vehicle owners, such as likely interests, audiences, behavioral patterns, and other look-alike style profiles.

As noted above, all or some of the additional information gathered from external sources (e.g., OMV records, census records, social media data, etc.) may be utilized to improve the accuracy of classification algorithms. For another example, once traffic records have been developed and detailed with such metadata sources providing probable demographic information, census information, interests, behaviors, and other look-alike details, the data can then be used for various types of analysis, such as regression analysis to control for independent and dependent variables. This may allow the reversion of the analytical outcomes to extrapolate demographic and other details from traffic information, regress to a given variable, and then application of the traffic insights to that variable. In this way, the traffic data collected in one location can be used to generate look-alike audiences for other geographic areas, municipalities, states, roads, or some other geospatial variable, and extrapolate the traffic readings from one location into individual or multiple correlating factors for another area. In this method, the combination of traffic data with various other data sources can then be transferred to different areas by controlling the intermediating variables in order to derive insights into areas that are similar to the area that is collecting traffic data, without having to directly collect traffic data in those look-alike areas. For example, if some pattern of traffic behavior is detected by embodiments of the present invention in a first area, and a strong demographic correlation can be generated to one or more other areas, then the traffic behavior from the first area can be extrapolated to infer traffic behavior in the other areas with high confidence.

It is foreseen that such vehicle and demographic data available from OMV records, census records, social media sources and other external sources may be otherwise utilized to identify demographic variables reflecting characteristics or behaviors that improve vehicle classification without departing from the spirit of the present invention. For example, untrained classification algorithms and/or classification algorithms relying on unsupervised learning may be configured at least in part based on such vehicle and demographic data within the scope of the present invention.

Roadway, Lane, and Vehicle Geocoordinate Positioning

Preferably, sensor grids according to embodiments of the present invention are configured for optimal accuracy enabling, for example, geospatial reasoning supporting the uses outlined elsewhere herein and others. Preferably, each sensor in the grid is associated with geocoordinate(s) that identify, to a high degree of precision and accuracy, the specific position of the sensor in terms of latitude and longitude and/or alternative geo-positioning coordinate systems. In this manner, sensor analysis methods disclosed herein may rely upon highly accurate positioning system(s) that identify exactly where each sensing event is taking place.

Further, according to typical road construction and mapping techniques, roads may be delineated according to right-of-way, easements, and other exterior boundaries registered, for example, with various Recorders of Deeds, plat maps, surveyors' maps, and according to multiple other methods that identify relative and absolute positions and contours of roadways. Overlaid on these exterior boundaries are interior divisions of the roadway for lanes, e.g., as delineated by markings upon the road, and typically recorded by builders in "as-built" files preserved by owners of roadways and referenced by surveyors when performing road work.

Turning back to embodiments of the present invention, combining high precision and accurate geo-positioning of each sensor of sensor grids embedded in a single slab and/or across multiple slabs joined by load transfer devices or connectors with roadway boundaries and road markings outlined above and delineating lanes for a road system, data processing and storage assets for embodiments of the present sensor system may identify the relative position and path of each lane of each roadway relative to the sensor grid(s).

Such mapping may enable generation of highly accurate, persistent local road maps with lane demarcations which support computations and calculations according to embodiments of the present invention including, for example, automated classification of vehicles, vehicle behaviors, and traffic patterns and behaviors and automated mapping of the vehicles and metadata to individual lane(s) equipped with sensor grids of embodiments of the present system. For example, in one or more embodiments, assignment of geo-coordinates to sensor grids may enable the roadway and road lanes to be overlaid in a digital mapping space. The computer system of embodiments of the present invention may also use sensor data from the sensor grid(s) to identify vehicle dimensions and positions and may attribute such vehicle dimensions and positions to the exact lane and road position on a combined digital map.

In this way, sensor grid(s) according to embodiments of the present invention may automatically identify the position of sensed vehicles on the combined digital map, and place the vehicles' exact location, orientation, direction of travel, speed, and dimensions on the digital map, at least in part relying on the high precision and accuracy geocoordinates corresponding to the sensors detecting the vehicle within the lane. Methods according to embodiments of the present invention may be applied simultaneously to all vehicles present upon a segment of a road through use of sensor grids, which may be accurately placed on the digital map across all lanes, and such aspects of the vehicles may be updated continuously across time with high precision and accuracy positional data updated at a high time and space resolution as the vehicles move.

Collision Detection & Safety Hazards

Tracking vehicles using sensor grid(s) embedded in and distributed across a single slab and/or multiple slabs joined by load transfer devices or connectors according to embodiments of the present invention may enable development of additional valuable insights. For example, vehicle movement and projected movement over a roadway may be compared against a variety of outside data points, for example indicating relative position with respect to instructional signage or other vehicles (e.g., emergency vehicles or other passenger vehicles). The comparison may yield output useful for traffic control systems, emergency response or other applications. Because the dimensions and positions of the vehicles may be identified continuously or substantially continuously according to embodiments of the present invention, the underlying sensor grid(s) and algorithms for classification and computation outlined herein may identify time(s), timeframe(s) and/or position(s) along a road when and/or where vehicles intersected and/or their paths are projected to intersect. In an embodiment, a likely collision is classified wherever tracked vehicles and/or their paths intersect or are closely adjacent for a moment or period of time, followed by a change in trajectory and separation of the vehicles' positions. Whenever embodiments of the present invention detect and determine the likelihood of such an occurrence, corresponding automated alert(s) may be generated and transmitted to interested authorities (e.g., emergency services) as outlined elsewhere herein.

Such collision detection capabilities of embodiments of the present invention may also enable storage of details of vehicle behavior immediately prior to and immediately following an event classified as a likely collision, and may automatically collect and store other available data that may be related to the likely collision, such as traffic signal status of proximate signals, and position(s), driver behavior(s) and speed(s) of other proximate vehicles.

In one or more embodiments, one or more algorithms (e.g., forming part of and/or in cooperation with a database management system) include instructions for automatically flagging likely collision classifications output based on sensor data collected by sensor grid(s) embedded in and distributed across a single slab and/or multiple slabs joined by load transfer devices or connectors. The algorithm(s) may automatically access a profile corresponding to the flagged likely collision classification. The profile may be customized based on geographic location, sensed characteristics of the vehicles involved in the collision, sensed characteristics of driver behavior of the vehicles involved in or adjacent to the collision, and other data points relevant to identifying which local variables are worthy of being recorded to later reconstruct the causes for a collision. For example, erratic sensed passenger vehicle behavior leading to a collision, alone or combined with determination that the likely collision occurred late at night, may be linked to a suspected intoxicated driver profile that instructs, among other things, collection of the involved vehicle's position data for an extended period of time prior to the collision. For another example, a daytime collision involving a freight truck may be matched to a profile customized for collecting and storing data relating to the movements of other vehicles on the roadway before and after the suspected collision occurred. One of ordinary skill will appreciate that multiple profiles may be combined wherever the matching conditions underlying their structure are present.

The profile may be matched to the flagged collision classification using available sensed data provided by the computer system. As noted above, the profile may contain instructions regarding what other relevant data to collect and store in the system's databases, including by identifying data objects in the system and timeframe of collection. The computer system of embodiments of the present invention may generally preserve raw sensor data and/or derived data for a limited period of time to conserve storage space. Storage duration may vary across data types and/or objects. The computer system may automatically (periodically or continuously) parse the aforementioned data storage profiles to identify storage requirements defined therein that exceed current storage duration settings, and may adjust the storage settings to ensure compliance with the most excessive of the profiles' storage requirements (generally and/or with respect to each data type and/or object).

As noted above, such datasets preserved in connection with suspected collisions may provide valuable information for collision reconstruction, and may be used to assign blame for collisions in connection with police or insurance investigations and/or in litigation settings.

Also as noted above, the computer system according to embodiments of the present invention may be configured to extrapolate vehicle paths or positions based on recent past sensed vehicle position(s). for example, the system may identify the position of vehicles at a high time resolution, and be programmed to extrapolate that position across presumptive curves based on potential curves derived from local roadway geometry, immediate trajectory history, and/or other vehicles' past, current, and/or presumptive trajectories. In this way, the system may identify the likelihood of a possible accident before it happens, whether by identifying the possibility for a collision between vehicles (e.g., where two vehicles are approaching an intersection on trajectories that indicate they will collide) and/or by determining that a vehicle may be at risk of other unsafe behavior (e.g., where the vehicle has crossed lane boundaries repeatedly and is now approaching another vehicle that is immediately adjacent to a lane boundary). Embodiments of the present invention may also determine that a vehicle has left the roadway, or may be in danger of leaving the roadway. For example, the computer system may output a likely road departure emergency based on a combination of variables relating to sensed vehicle behavior and stored roadway data regarding the characteristics of the roadway over which it travels. In a more particular example, a classification algorithm of the computer system may receive as input data indicating that the roadway in question is a mountain pass with a history of run-off-the-road accidents, as well as vehicle position data indicating a vehicle was detected moving at a high rate of speed immediately before its trajectory crossed a boundary of the edge of the road and the vehicle was not further detected. Based on such input, the algorithm may output a classification corresponding to a likely road departure emergency and the computer system may access a corresponding data preservation profile, collect and store potentially relevant according to the profile, and/or generate alert(s) to emergency service(s) or the like.

Built Environment Insights

Using geopositional data generated by the sensor grids of embodiments of the present invention, along with road boundary and lane marking data, vehicle and traffic data may be digitally overlaid on other maps representing businesses, residences, industry, and other real estate developments adjacent to such roads. Such maps may also be populated with adjacent ingress and egress points for parking lots or other roadways. Utilizing the maps and sensed vehicle data, calculations of flow rates and vehicle counts may be made for timeframes prior to and following vehicle passage through ingress and egress points to calculate the flow of vehicles into parking lots and/or turning onto new road segments.

Such calculations may be in addition to, or in replacement of, alternative vehicle count and flow rate measurements that are typically used by public agencies, real estate developers, property managers, and other stakeholders that have an interest in understanding traffic data for surrounding areas.

Sensor grids and slabs according to embodiments of the present invention may also inform usage of unimproved stretches of roadway. For example, sensor grids in paving units at ingress lanes to an intersection may generate data permitting generation of extrapolated values for flow of traffic through each lane and into egress lanes of the intersection. Such extrapolated values may support generation of high-quality estimates of the traffic flows on segments of roadways that are not improved with sensor grids of embodiments of the present invention. Accordingly, the count and flow of vehicles turning or going straight at each segment of roadway may be expanded beyond individual areas covered by sensor grids of embodiments of the present invention with a high degree of accuracy, e.g., up to the point that there is an additional unmonitored ingress or egress point. In one or more embodiments, improvement of alternating (monitored) intersections with sensor grids may produce high-quality interpolations of the traffic flows at unmonitored intersections in between the monitored intersections.

More generally, utilizing all or some of the methods outlined herein, sensor data and derivative or refined data and values, derivative traffic values, make and model classifications, demographic profiles, probabilistic audience models, and the like may be collected and/or generated. As noted immediately above, embodiments of the present invention may also be configured to generate significant and valuable analytics based on traffic movements as they relate to the built environment. For example, owners of a restaurant may have an interest in how many vehicles pass by its location near a mealtime, where count is limited to vehicles with owners matching a specified demographic profile (i.e., a preferred audience). Such property stakeholders may use the data outlined above in order to make improvements to the operation of their business. For another example, municipal authorities may use the data outlined above to better understand traffic behaviors, how changes to lanes or signals affect dynamic variables such as vehicle speeds, acceleration or deceleration rates, collision risks, and so on. For still another example, real estate developers may use such data to optimize selection of properties for development, or to optimize selection of types of development to better match the derived demographics of the pre-existing traffic with their preferred audiences for the real estate development.

Pavement and Subgrade Condition Indexing

Sensor grids according to embodiments of the present invention may also provide additional insights beyond traffic data. As discussed previously, sensor data streams from the grids may require significant computation to derive traffic data elements from the data streams. Complicating factors of such analyses include internal strain profile(s) of the pavement and transient thermal noise. An internal strain profile describes the distribution of strain inside the solid body of the pavement slab or unit at rest. This data point provides valuable insights into pavement condition.

Internal and external permanent or semi-permanent fluctuations in roadway stress and strain may yield changes in condition of the subgrade elements beneath the roadway, changes or deterioration of reinforcement structures, if any, and/or deterioration of the paving material from which the roadway is constructed.

As noted elsewhere herein, certain developments in a sensing volume or slab are preferably detected by relatively large element sensors. These may include, for example, a large-scale feature such as a large crack or a shift in subgrade, and/or shifting or deterioration of a large load bearing member of the sensing volume or slab or of underlying structure, such as detection of a change in condition of a beam in a bridge deck or parking garage structure or an external source of strain such as a very large, tracked vehicle.

A baseline strain profile may be generated by, for example, reading a strain profile from a sensor of a sensor grid at rest following initial installation of a pavement slab or unit in which the sensor is encased, and removing any traffic signals or thermal noise. Following this initial state, the pavement slab or unit will deteriorate across its operational life, in response to vehicle loads, environmental changes, subgrade changes, and other events or conditions that temporarily or permanently alter the pavement.

Once the baseline strain profile is established, additional readings can be taken at intervals in a manner that allows regression of variables to isolate the pavement condition and identify changes over time. For example, recording relaxed strain profiles at a pre-determined interval, and normalizing the profile data for environmental changes (temperature, precipitation, atmospheric pressure, etc.) may permit generation of a graph of internal strain profile over time. The pavement condition can be estimated and indexed by interpreting the changes in the strain on such graph(s).

In an embodiment, a first portion of pavement may comprise one or more slab(s) stretching across a first longitudinal location of a road. A second portion of pavement may comprise one or more slab(s) stretching across a second longitudinal location of the road adjacent the first longitudinal location. The first portion of pavement may include one or more sensor grid(s) according to embodiments of the present invention, and the second portion of pavement may not. However, because vehicles typically travel in a direction of travel (e.g., longitudinally) across slabs or units of pavement and only depart or enter the pavement at egress points and ingress points, it may reasonably be extrapolated that pavement slab(s) at the second longitudinal position adjacent to slab(s) at the first longitudinal position will receive the same or similar traffic loading. As such, as long as the composition and initial condition of the second portion of pavement are comparable to the first portion of pavement, the pavement condition for the second portion of pavement may be derived with a high level of accuracy from a pavement condition index created from the sensor grid readings of the strain profile changes over time for the first portion of pavement.

In a similar manner to the pavement condition index outlined above, other insights may be derived to index subgrade condition according to embodiments of the present invention. For example, before any vehicle is present on a sensor grid of such a slab, the slab is at rest, and has a baseline rest profile for strain distribution. When a vehicle first imposes its weight on the slab, the slab has a loading response. The vehicle travels across the slab, creating strain readings. The vehicle then leaves the slab, creating an unloading response. By reading the slab's loading and unloading responses when the slab is new, a subgrade condition baseline can be established. By then taking subsequent readings of the loading and unloading responses at intervals, and controlling for variables, changes over time of the pavement loading and unloading responses may be graphed.

The loading and unloading responses of the slab may be compound measurements that result from combination of the slab's baseline condition, the vehicle dynamics creating the load(s), and the subgrade condition(s). Using techniques already described, vehicle dynamics and pavement condition may be controlled for. Subgrade condition may be the remaining prominent factor in the slab's response to loading and unloading. Through generating a graph of pavement hysteresis in response to loading and unloading while controlling for vehicle dynamics and pavement condition, the pavement hysteresis can be interpreted to derive the slab's subgrade condition. In this manner, systems of sensors according to embodiments of the present invention may support generation of subgrade condition indexing functions. In a similar manner to pavement condition indices, subgrade condition indices generated for a first segment of pavement including sensor grid(s) according to embodiments of the present invention may be extrapolated for use with adjacent segment(s) of pavement that do not include such grid(s), preferably wherever the composition and initial condition of the adjacent segments are comparable.

Other Exemplary Embodiments of Slabs

Turning now to FIGS. 6-9, another exemplary embodiment of a self-monitoring modular pavement slab 200 is illustrated. Preferred spatial aspects and dimensions shown therein are merely exemplary and not intended to be limiting. The slab includes dowel pockets 202, 204 along opposite faces 206, 208 extending transversely to a direction of travel of vehicles and/or other loads. Load transfer devices or connectors comprising dowels extend between and are received within respective paired male 202 and female 204 dowel pockets of adjacent slabs (upon assembly). Top and bottom reinforcement mats 205 (e.g., comprising grids of intersecting epoxy coated rebar) are embedded within the body of the slab 200 and illustrated in FIG. 6A. It is foreseen that embodiments of the present inventive concept illustrated in FIGS. 6-9 are interoperable with and/or may comprise or be assembled in accordance with the paving systems, apparatuses and methods described in U.S. Pat. No. 9,920,490 to Sylvester, filed May 16, 2016, and entitled MODULAR PAVEMENT SYSTEM (the "'490 patent"), which is hereby incorporated by reference herein in its entirety.

It should be noted that opposite faces 210, 212 of the exemplary slab that extend parallel to the direction of travel are joined to adjacent slabs for load transfer utilizing tie bars 213 and pockets 214 rather than dowels and corresponding pockets 202, 204. However, it is foreseen that these load transferring connectors may be employed along different faces and in different patterns without departing from the spirit of the present invention.

Sensor elements of the slab 200 include Type 1 Fiber Optic Sensing System (FOSS) interface cables extending in two loops 215, 216 longitudinally in the direction of travel (i.e., in the "y" direction). The loops 215, 216 are spaced across the width (i.e., the "x" direction) of the slab based on average axle track of vehicles. Alternatively formulated, the loops are spaced so as to be positioned directly below or as close as possible to the wheels of as many vehicles as possible.

Figure 6:
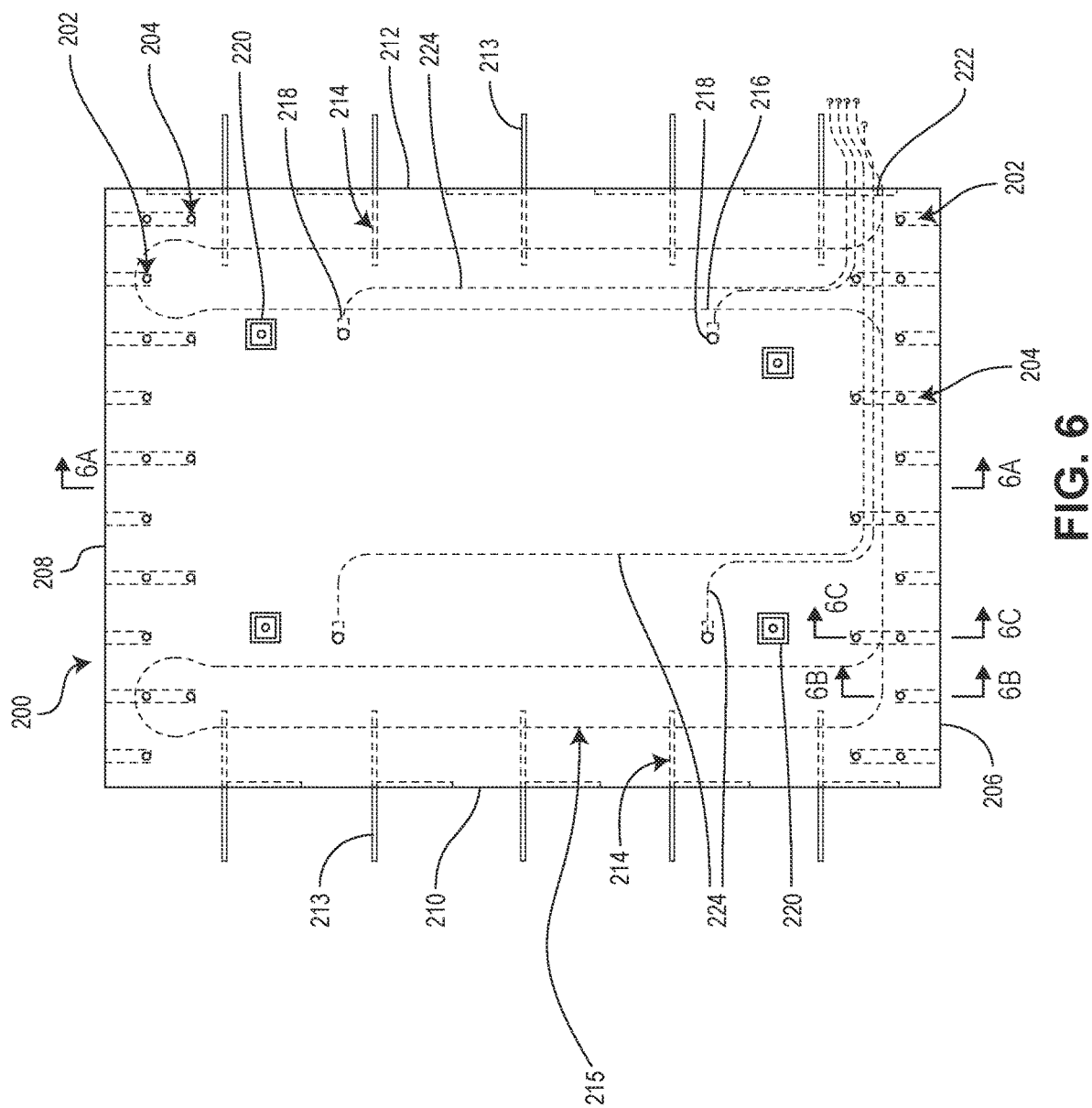
FIG. 6 is a top view of a self-monitoring modular pavement slab according to embodiments of the present invention.
Figures 7, 8, 9:
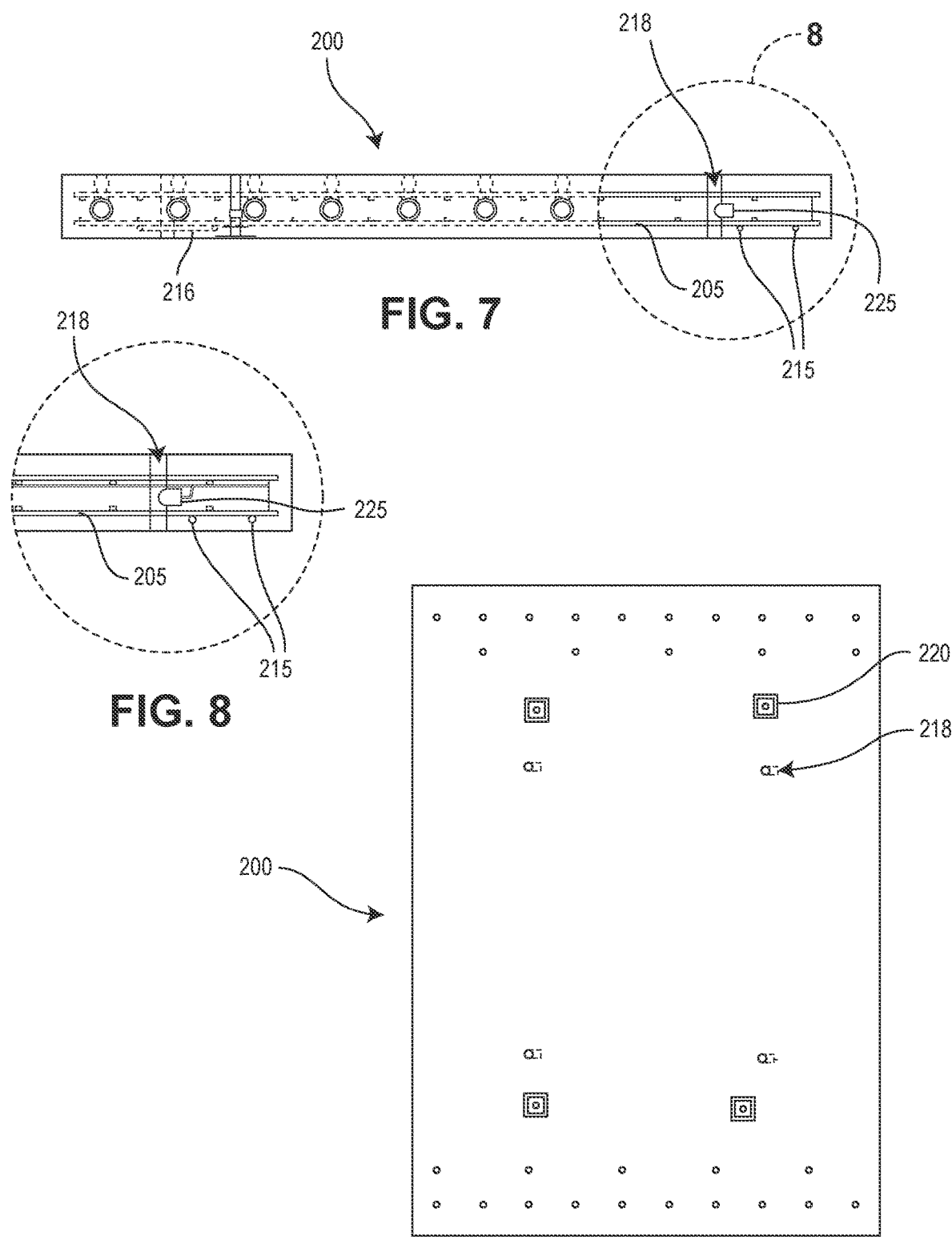
FIG. 7 is a front view of the self-monitoring modular pavement slab of FIG. 6, partially sectioned along a line bisecting a grout port within a limited field of view corresponding to FIG. 8 and illustrating fiber optic sensing cables attached to the bottom reinforcement mat.
FIG. 8 is the detailed cross-sectional view of the grout port within a limited field of view of FIG. 7, illustrating the grout port extending between top and bottom sides of the slab for fluid communication between top and bottom surfaces of the slab and provision of access to a terminal of an ethernet cable embedded in the slab.
FIG. 9 is a top view of the self-monitoring modular pavement slab of FIG. 6, detailing exemplary dimensions and positions of grout ports and lifting elements of the slab.
Figure 10:
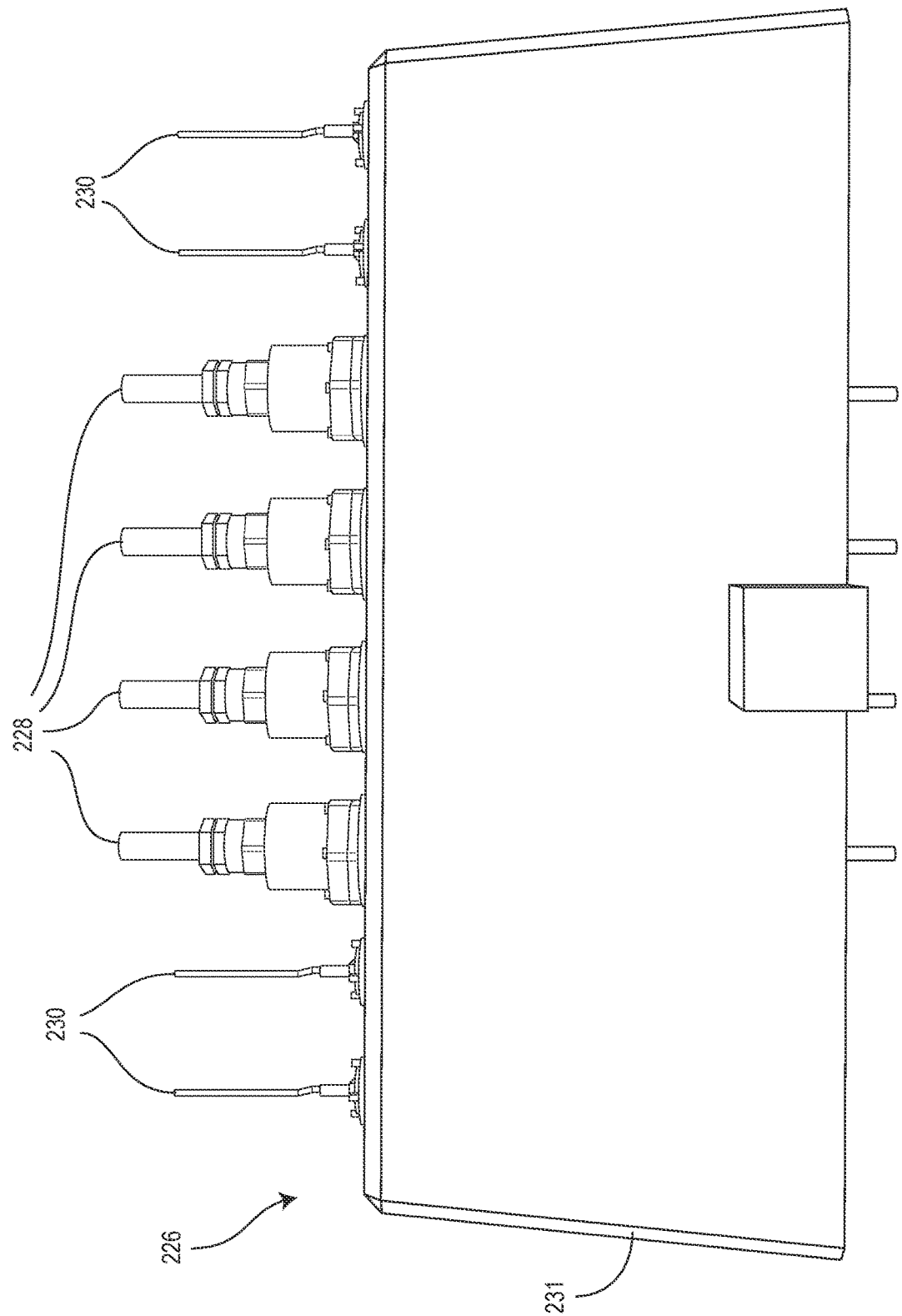
FIG. 10 is a top view of an edge connector of a self-monitoring modular pavement slab according to embodiments of the present invention.
Figure 11:
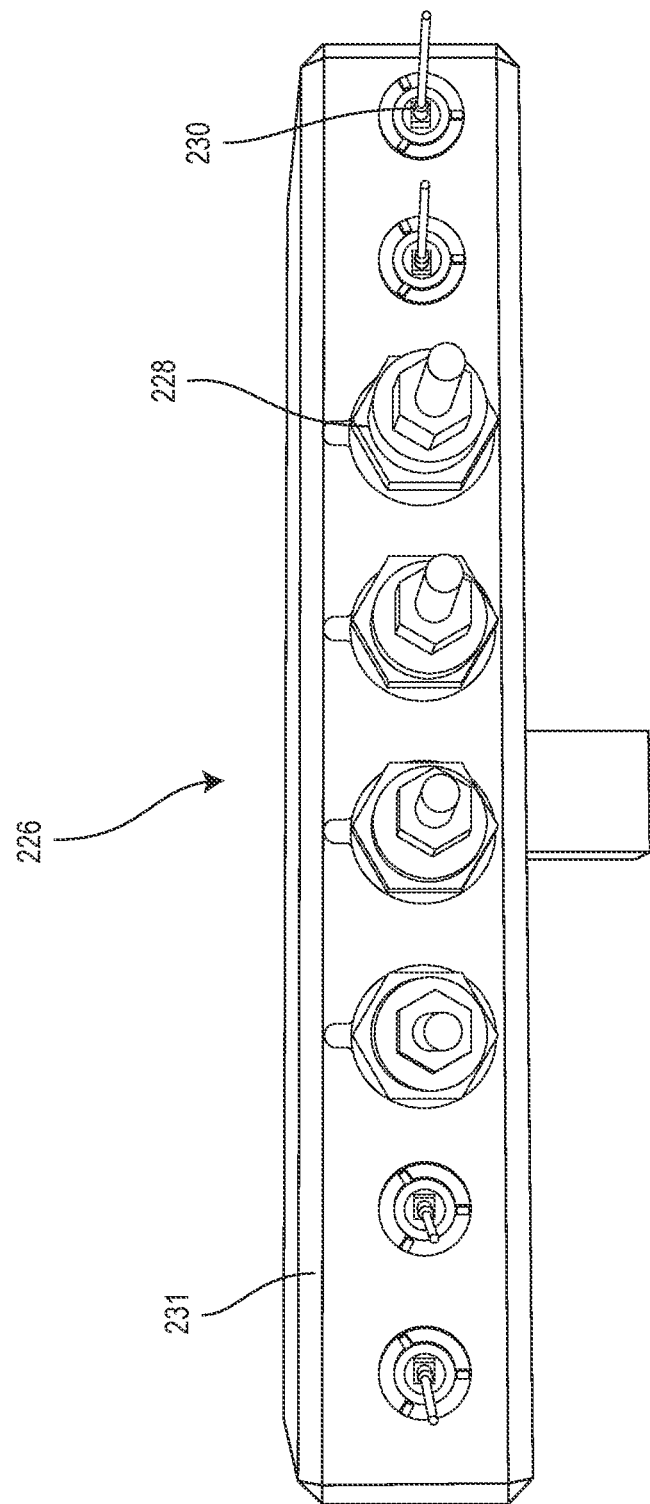
FIG. 11 is a rear view of the edge connector of FIG. 10.
Figure 12:
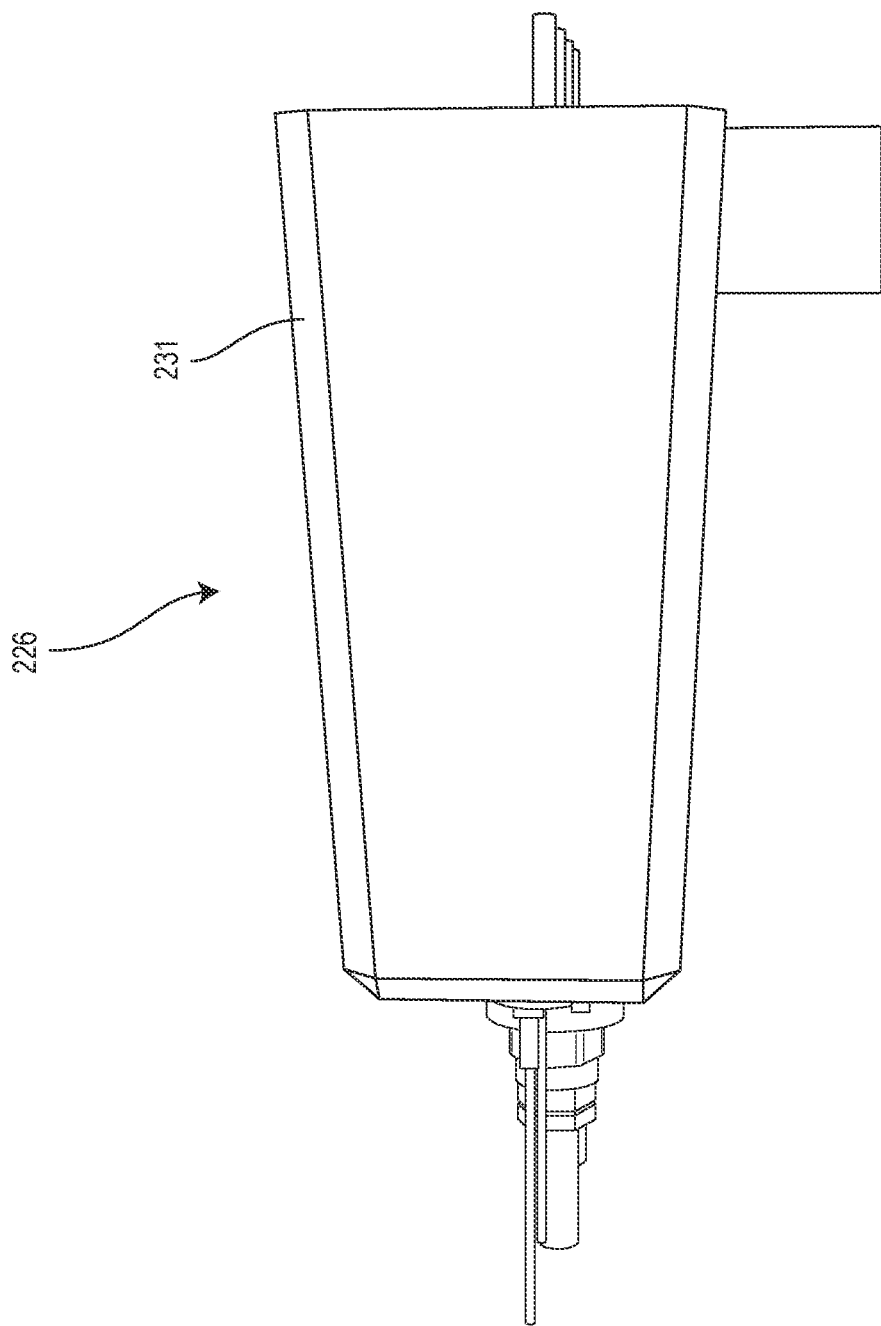
FIG. 12 is a side view of the edge connector of FIG. 10.
Figure 13:
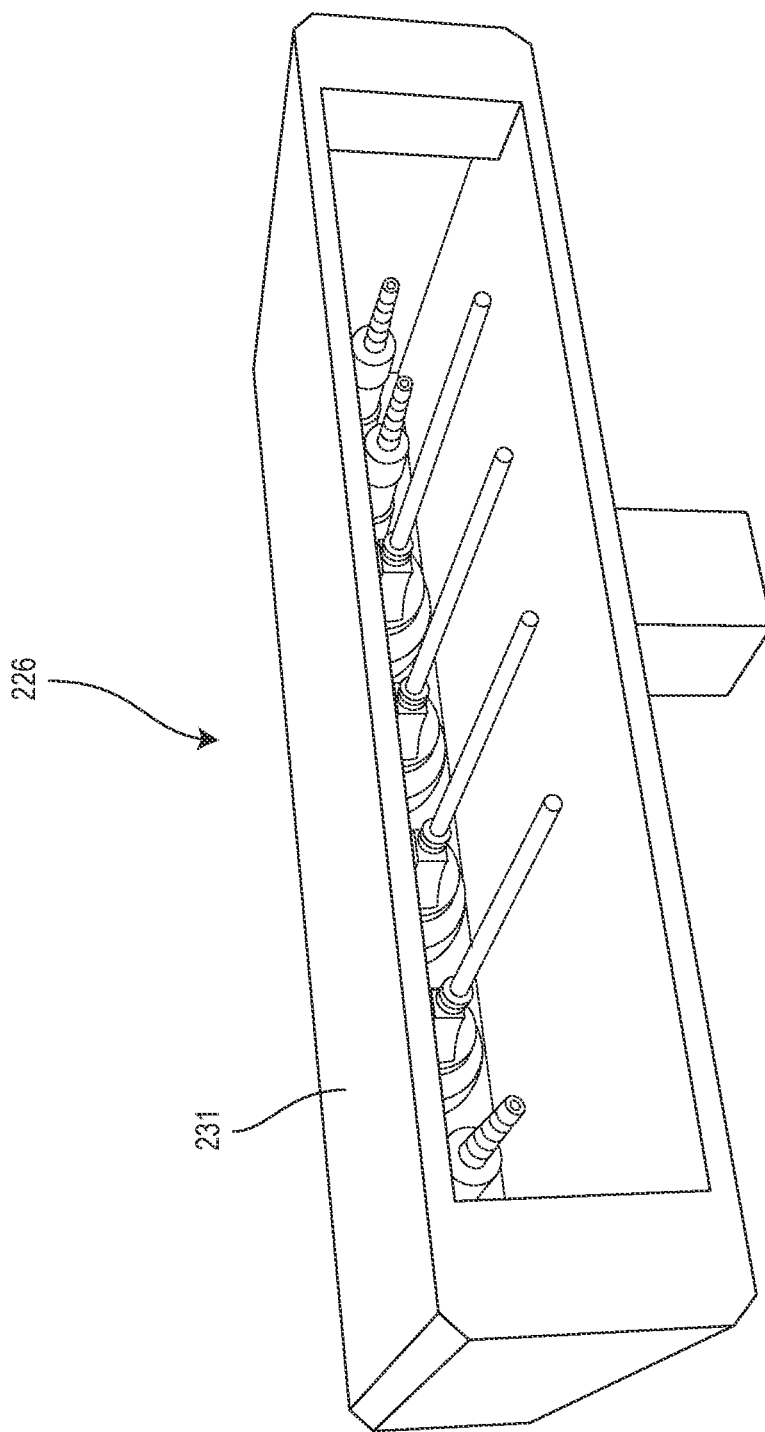
FIG. 13 is a front perspective view of the edge connector of FIG. 10 illustrating an interior space of the edge connector.

In one or more embodiments, and in accordance with the embodiments illustrated in FIG. 6, one or both of the loops 215, 216 overlap with one or more pockets 202, 204, 214 (and corresponding dowels, tie bars 213 or other load-transferring connectors once assembled), when considered in the XY plane corresponding to the width and length of the slab 200. In the illustrated embodiment, each of loops 215, 216 overlaps with multiple pockets 202, 204, 214 as they extend across the XY plane in the slab 200. Accordingly, the loops 215, 216 may provide valuable information regarding localized strain values responsive to loading both in regions of the slab 200 that are remote from and proximate or adjacent to load-transferring connectors. This information may help to distinguish between types of failures, if present, in the body of the slab 200 and/or the underlying sub-grade.

Also in accordance with the embodiments illustrated in FIG. 6 and as described above in connection with vehicle wheel paths, the loops 215, 216 preferably provide strain gauges and coverage on both sides of a lateral center of the slab 200, preferably with approximately half or 50% of the strain gauges on each side (that is, a middle of the slab along the width dimension or X axis corresponding to bisecting line 6A-6A). Moreover, the loops 215, 216 preferably extend along at least fifty percent (50%), at least seventy-five percent (75%), or at least eighty-five percent (85%) of the overall length of the slab 200 (along the longitudinal axis Y), considering the precast length of the slab 200 and not considering any buffering substances or load-transferring devices incorporated at installation. In the illustrated embodiment, the loops 215, 216 extend along approximately ninety percent (90%) of the overall length of the slab 200.

Moreover, in a preferred embodiment, approximately or exactly half or fifty percent (50%) of the strain gauges are on each side of the mid-point along the y-axis. Wherever the roadway is curved, the y-axis in the direction of travel may be determined to be the average direction of travel for the segment of roadway, with the x-axis or width dimension being perpendicular to the y-axis. More generally, in one or more embodiments, at least thirty percent (30%) of the vehicle-sensing strain gauges of a slab or sensing volume of a roadway segment are on a first side of the mid-point along the y-axis, at least thirty percent (30%) of the strain gauges are on a second (opposite) side of the mid-point along the y-axis, at least thirty percent (30%) of the strain gauges are on a first side of the mid-point along the x-axis, and at least thirty percent (30%) of the strain gauges are on a second (opposite) side of the mid-point along the x-axis. It should be noted that wherever a strain gauge or sensor is positioned on or straddles a mid-point, for purposes of calculating the above-referenced percentages relating to sensor positioning the portion of the length (i.e., for FBG sensors) or spatial resolution (i.e., for non-FBG sensors) of each such sensor that extends on a first side of that mid-point may be counted toward sensors positioned on the first side of the mid-point, and the portion of the length or spatial resolution of each such sensor that extends on a second opposite side of that mid-point may be counted toward sensors positioned on the second side of the mid-point. Such a balanced distribution may improve aspects of sensing changes within the sensing volume and/or relating to the condition of the roadway segments and/or underlying conditions. Additional or alternative methods for optimizing sensor element and/or loop positions are described in more detail above.

The slab 200 of FIGS. 6-9 includes grout ports 218 extending between top and bottom surfaces (see FIGS. 7-8) and lifting elements or receivers 220 (offset from the grout ports 218 and configured for receiving hooks or the like for lifting during installation and removal) proximate each corner of the slab 200. The slab 200 also includes a router port 222 and ethernet cables 224 extending between the router port 222 and each of the grout ports 218. The ethernet cables 224 each terminate in a terminator/connector 225 accessible via the grout ports 218 (see FIG. 8). Another embodiment of the terminator/connector 225 is discussed in more detail in connection with FIGS. 14A-E and referred to as a connector terminal 234. The ethernet cables 224 provide electronic communication between the grout ports 218 and the router port 222. The router port 222 and the grout port 218 may each provide interfaces for use with external communication elements. The FOSS interface cables 215, 216 may communicate raw sensor data to embedded, remote and/or adjacent processing elements via the router port 222, and the ethernet cables 224 may carry data between the remote or adjacent processing elements and the grout port 218.

Exemplary Embodiment of Communication Port(s)

Turning now to FIGS. 10-13, an exemplary edge connector 226 is illustrated that may be used as or in conjunction with and/or for forming communication ports 50 and/or router port(s) 222 described above. The edge connector 226 is an element and/or is used in formation of slab(s) 10, 200 according to embodiments of the present invention that allows the termination of cable and wire connections at the edge of a slab 10, 200. This ensures that the cable and wire components inside the slab(s) 10, 200 are terminated at the boundary of the slab(s) 10, 200, leaving no "leads", "pigtails", or other cable and wire extended beyond the body of the slab(s) 10, 200. The edge connector 226 may be used to form terminals that terminate internal cable(s) and/or wire(s) into a connection (e.g., a plug or socket).

Terminating such cable(s) and wire(s) at the edge of a slab provides several benefits, not the least of which is that the enabled intermediary connection between the slab and a secondary connection (whether a control center, a junction box, or other power or networking element) can be installed during or after the installation of the slab itself. All or part of the edge connector 226 and/or individual terminals, plugs and/or sockets it houses may also be replaced during or after servicing the slab 10, 200 or an adjacent segment of pavement. In case of damage to such intermediary connection elements, for example from deterioration, malfunction, severance during a utility operation, or tampering, one or more of the intermediary connection elements may be replaced without requiring the replacement of the slab 10, 200 more generally. Moreover, where all or most cables are embedded and/or housed within a slab 10, 200, production efficiencies may be realized through modular production of mass quantities of such slabs.

By terminating the cable and wire at the edge of the slab 10, 200, the slab 10, 200 is resilient to any damage to cable that lies outside the body of the slab 10, 200.

The edge connector 226 may be left in the pavement slab 10, 200 once the slab 10, 200 is finished, and thus consumed by the production of the pavement slab 10, 200. Alternatively, it may be removed once the slab 10, 200 is finished, and thus a single edge connector 226 molding element can form multiple edge connector 226 recesses in multiple pavement slabs 10, 200. In this embodiment, we will consider an edge connector 226 that acts as a molding element that is removed after fabricating the slab 10, 200.

The edge connector 226 is shaped in such a way to support termination of a plurality of cable and wire elements at the edge of the pavement slab 10, 200. In this example, the edge connector 226 terminates four Ethernet connections 228 (e.g., see cables 224 of FIG. 6) and four fiber optic connections 230 (e.g., see terminal ends of loops 215, 216 of FIG. 6). The edge connector 226 is molded in such a way that each terminator is attached to the edge connector 226, and each terminator can be capped, and thus not connected to an intermediary connecting cable or wire, or connected and thus have the intermediary connecting cable or wire attached. In this embodiment we will consider the use of the edge connector 226 with the terminators capped.

While it is possible for the edge connector 226 terminators to be present on any internal face of the edge connector 226, including the sides, top, and bottom, in this embodiment it is assumed that the terminators are present on the interior side of the edge connector 226.

The edge connector 226 locks to each of the terminators 228, 230 using a lock ring, which can be a clip, a screw-type, a pin-type, or any other type of locking system that locks the terminator 228, 230 to the edge connector 226. This holds the internal cable and wire and the terminator 228, 230 in the correct location in the edge connector 226 during forming. After forming, the locking system is released so that the terminator element 228, 230 is no longer connected to the edge connector 226 element.

Once the locking system is released from the terminators 228, 230, the edge connector 226 may be extracted from the paving system, while the terminators 228, 230 stay in place, formed into the solid body of the pavement slab 10, 200. The ability to extract the edge connector 226 once forming is complete allows a single edge connector 226 mold to be reused for the production of multiple paving slabs 10, 200.

The edge connector 226 forms a recess within the edge of the slab 10, 200, and the terminators 228, 230 reside at the back of the recession (i.e., the terminals preferably do not protrude from the side of the slab 10, 200). The recess is preferably configured such that an exterior connector that is connected to the terminals or terminators 228, 230 is recessed into the slab 10, 200 deep enough that the exterior connector also does not extend beyond the vertical face of the side of the slab 10, 200. This ensures that even when the interconnections are in place, the vertical face of the side of the slab 10, 200 forms a smooth plane when adjacent to another segment of pavement, and the connector elements do not protrude beyond that smooth plane to interfere with the interface to the adjacent pavement (or other material such as curb and gutter, shoulder, earthworks, foundations, etc.).

The edge connector 226 provides a routing element that directs intermediary connection cable and wire into a conduit, so that the intermediary cable and wire can be routed through a conduit to a receptacle where the intermediary cable and wire terminate, whether a control center, junction box, or other terminus. The routing element is shaped such that it can gather the cable and wire resulting from the connections at the edge connector 226, and direct said cable and wire into the conduit.

The edge connector 226 is preferably configured to form environmentally secure connections on both internal and external sides of the edge connector 226, such that an environmentally secure connection remains within the solid body of the pavement after casting, protecting the connection from any intrusion of pavement materials or environmental contamination such as water seeping through the paving material. The edge connector 226 preferably provides an environmentally secure connection on the exterior side of the connection as well, so that the intermediary connector is also environmentally secured against debris, paving materials, or environmental contamination.

It may also be preferable, as noted above, to remove the edge connector 226 (e.g., in embodiments where it acts as a molding element) once fabrication of a pavement slab 10, 200 is completed. Such embodiments of the edge connector 226 (see FIGS. 10-13) may include a shell 231 that tapers inward (i.e., into the slab when assembled thereto) such that the shell/molding element 231 may be removed from the pavement slab 10, 200 after fabrication (i.e., after the body of the slab 10, 200 cures). The actual degree of taper, or "draft", may depend on the design of the edge connector 226 and the paving slab 10, 200, but a value between 1/16th of an inch per inch of convex length may be sufficient.

Further, it is preferable that all or most of the surfaces that contact paving materials of the slab 10, 200 during formation present profiles that taper to some extent toward the interior of the slab 10, 200, to reduce resistance to removal after formation. Put another way, the edge connector 226 may be convex in other of its elements, growing narrower in each dimension that contacts paving materials of the slab 10, 200 along the direction of recession into the pavement, such that few or no angle(s) of edge connector 226 surfaces that contact paving materials are larger than any element of the edge connector 226 in the direction of the exterior. By maintaining such a convex shape, the edge connector 226 may improve its capacity to be removed after fabrication is completed.

It is apparent from the convex design of the preferred removable embodiment of the edge connector 226 that the cavity developed by such an embodiment of the edge connector 226 within the pavement is preferably concave, such that the concavity is continually decreasing as it moves to the interior of the pavement and increasing as it moves to the exterior of the pavement, and such that the dimension of the concavity is larger towards the opening and smaller towards the interior.

In furtherance of the removability of this embodiment of the edge connector 226, the edge connector 226 may be gripped mechanically and/or manually to facilitate its removal. Various methods may be utilized for such removal. One method is to include a hand grip at the exterior edge of the edge connector's shell 231, so that it can be gripped and pulled. Another method is to incorporate a plug with a threaded element embedded in the shell 231, such that a bolt can be inserted into the threaded element and twisted for threaded connection therewith, causing the bolt to drive through the edge connector shell 231 wall and into the bordering interior wall surface of the paving slab 10, 200. As the bolt further extends in a threading action, its engagement with the bordering interior wall of the slab drives the edge connector shell 231 backwards and out of the recess it formed. A similar method is accomplished by using a threaded element that threads to a bar which can be pulled manually or mechanically.

It is apparent from this description that hand grips or threaded elements may be incorporated in a multiplicity of locations along the shell 231 of the edge connector 226 to improve the ability and selectability of gripping or mechanical force locations to improve the capacity to remove the edge connector 226.

The edge connector 226 may also include a bracing system for the shell 231 while within the convex cavity to ensure that the paving materials cast around the shell's 231 external dimensions do not move, shift, displace, crush, or deform the shell 231 during the forming process.

In order to prevent the edge connector 226 from moving during the forming process, it is also anticipated that edge connector 226 may be connected to a corresponding casting table, whether by means of a clamp, adhesive, pins, or threaded elements that allow the edge connector 226 to screw, bolt, or otherwise be temporarily attached to a plate or face of the casting table.

The edge connector 226 may be installed on any face of the paving slab 10, 200, or multiple faces of the paving slab 10, 200, including to any or all of vertical, horizontal, top, bottom or side faces. In this embodiment it is assumed that the edge connector 226 is installed in one or more vertical faces along one or more sides of the paving slab 10, 200. But this does not preclude the edge connector 226 being installed in the top or bottom of the paving slab 10, 200 under some circumstances.

Exemplary Embodiment of Expansion Ports

The edge connector 226 provides a terminus for cable and wire present in the body of the pavement slab 10, 200. Such cables and wires are preferably embedded in the slab 10, 200, and extend to other terminuses along other portions of the slab 10, 200. The other terminuses may comprise other receivers or edge connectors 226 at different locations along the slab 10, 200. In this manner, the edge connector 226 may act as a pass-through to deliver a cable or wire connection across a paving slab 10, 200, and a receiver associated with another terminus of the cable or wire may be positioned inside the body of the paving slab 10, 200. In this embodiment we will discuss such a receiver, comprising an element internal to the paving slab and referred to for ease of reference as an "expansion port" 232. An embodiment of the expansion port 232 is discussed above in connection with grout ports 218 and terminators/connectors 225.

The expansion port 232 may correspond to another connector terminal within the paving slab 10, 200, which may be independent or connected to the edge connector 226. The expansion port 232 may include a connector terminal 234 positioned in a vertical cavity 236 in the paving slab 10, 200. The vertical cavity 236 may be used for lifting, leveling, and/or grouting the pavement slab 10, 200, or for other purposes not described here. The expansion port 232 may provide a connector terminal 234 recessed in the pavement slab 10, 200 adjacent to the vertical cavity 236 at some location. For example, a connector terminal 234 may be embedded in a sidewall defining such a vertical cavity 236 (e.g., serving as a grout port 218; see FIG. 8). A lifting receiver (not shown) may also be embedded in the sidewall. Leveling elements (not shown) may also be housed within the cavity 236 and/or embedded in the sidewall.

The expansion port 232 may provide an environmentally secure connection on the interior, where the connector terminal 234 resides in the solid body of the pavement slab 10, 200 and is embedded in the sidewall defining the cavity 236. In one or more embodiments (see FIGS. 14A-E), the sidewall defining the cavity 236 may define a general cylindrical profile, but may include a recessed portion in which the connector terminal 234 is embedded. The recessed portion may define a horizontal cavity 238 recessed from the general vertical cavity 236 profile and providing space into which an environmentally secure external connector may be introduced for establishing electronic communication at the embedded connector terminal 234 without the external connector protruding into the vertical cavity 236. In this manner, an element can be connected to the expansion port 232 using an environmentally secure connection, without said connection protruding into the vertical cavity 236. If the external connector does not enable external wireless communication with the wire or cable embedded in the slab 10, 200, but instead is joined to a cable or wire extending externally from the slab 10, 200, it is noted that such a cable or wire is generally of much smaller profile than the external connector itself, allowing the benefit of an expansion port 232 recessed from the vertical cavity 236 to be realized.

Moreover, embodiments of the present invention may also include an expansion module 240. An expansion module 240 may comprise one or more electronic components, such as a sensor module and/or communications module (e.g., a wireless router). The expansion module 240 may be inserted into the vertical cavity 236 and may connect to the expansion port 232 and/or the connector terminal 234 thereof. The space of the vertical cavity 236 available for the expansion module 240 may not occupied by the connector inside the expansion port 232.

The expansion module 240 may include and/or be in wired connection with a connection cable plugged into the connection terminal 234 of the expansion port 232. The expansion module 240 may be recessed into the vertical cavity 236. The vertical cavity 236 may be filled with a material in order to conceal and protect the expansion module 240.

In some cases, the expansion port 232 may not be used during or immediately following the initial installation of the pavement, and in such cases the expansion port 232 may have a plug (not shown) inserted that seals the expansion port 232 from the vertical cavity 236. The vertical cavity 236 may also be filled with some material in order to conceal and protect the expansion port 232. In the event that the expansion port 232 needs to be accessed, the vertical cavity 236 may be excavated, and the expansion port plug removed. Thereafter, an expansion module may be plugged into the connection terminal 234 of the expansion port 232 and inserted into the vertical cavity 236, and the vertical cavity 236 may be filled.

Having now described the features, discoveries and principles of the general inventive concept, the manner in which the general inventive concept is constructed and used, the characteristics of the construction, and advantageous, new and useful results obtained; the new and useful structures, devices, tools, elements, arrangements, parts and combinations, are set forth in the appended claims.

It is also to be understood that the following claims are intended to cover all of the generic and specific features of the general inventive concept herein described, and all statements of the scope of the general inventive concept which, as a matter of language, might be said to fall therebetween.

Although the invention has been described with reference to the embodiments illustrated in the attached drawing figures, it is noted that equivalents may be employed and substitutions made herein without departing from the scope of the invention as recited in the claims.

Having thus described various embodiments of the invention, what is claimed as new and desired to be protected by Letters Patent includes the following.

What is claimed is:

1. A pavement system comprising:
   a slab having a body comprising pavement materials presenting a top surface;
   a reinforcement layer comprising geogrid materials embedded in the body;
   a plurality of strain sensors fixed to the reinforcement layer;
   a processor configured to collect multiple electrical signals across time from each of the plurality of strain sensors and to analyze the electrical signals to determine one or more of: (A) risk of a structural defect in the slab, (B) risk of a problem with underlying subgrade beneath the slab, and (C) movement of passing objects across the top surface; and
   wherein the plurality of strain sensors comprises an optical fiber cable embedded in a configuration that includes a bend with a bend radius of at least twenty millimeters (20 mm) and each of the plurality of strain sensors is separated from the bend by a length along the optical fiber cable of at least one centimeter (1 cm).

2. The pavement system according to claim 1, wherein the plurality of strain sensors are vehicle-strain sensors configured to detect strain on the body resulting from vehicles traveling across the top surface.

3. The pavement system according to claim 2, wherein the plurality of vehicle-strain sensors operate at a scanning rate of at least five hundred Hertz (500 Hz).

4. The pavement system according to claim 1, wherein the slab comprises a precast slab, further comprising a plurality of load-transferring connectors embedded along at least one of a plurality of sides of the slab and attached to an adjacent structure, the plurality of load-transferring connectors being configured to transfer load on the precast slab corresponding to the passing vehicles between the precast slab and the adjacent structure.

5. The pavement system according to claim 1, further comprising a temperature sensor embedded in the body.

6. The pavement system according to claim 5, wherein the processor is configured to make the determination based at least in part on temperature data from the temperature sensor.

7. A pavement system comprising:
a slab having a body comprising pavement materials presenting a top surface;
a reinforcement layer comprising geogrid materials embedded in the body;
a plurality of strain sensors fixed to the reinforcement layer;
a processor configured to collect multiple electrical signals across time from each of the plurality of strain sensors and to analyze the electrical signals to determine one or more of: (A) risk of a structural defect in the slab, (B) risk of a problem with underlying subgrade beneath the slab, and (C) movement of passing objects across the top surface; and
wherein the plurality of strain sensors comprises an optical fiber cable and each of the plurality of strain sensors is separated from each other of the plurality of strain sensors by a length along the optical fiber cable of at least one centimeter (1 cm).

8. A pavement system comprising:
a slab having a body comprising pavement materials presenting a top surface;
a reinforcement layer comprising geogrid materials embedded in the body;
a plurality of strain sensors fixed to the reinforcement layer; and
a processor configured to collect multiple electrical signals across time from each of the plurality of strain sensors and to analyze the electrical signals to determine one or more of: (A) risk of a structural defect in the slab, (B) risk of a problem with underlying subgrade beneath the slab, and (C) movement of passing objects across the top surface; and
wherein the reinforcement layer is configured in a grid pattern and extends across at least seventy percent (70%) of a length of the slab and across at least seventy percent (70%) of a width of the slab.

9. A pavement system comprising:
a slab having a body comprising pavement materials presenting a top surface;
a reinforcement layer comprising geogrid materials embedded in the body;
a plurality of strain sensors fixed to the reinforcement layer; and
a processor configured to collect multiple electrical signals across time from each of the plurality of strain sensors and to analyze the electrical signals to determine one or more of: (A) risk of a structural defect in the slab, (B) risk of a problem with underlying subgrade beneath the slab, and (C) movement of passing objects across the top surface;
a temperature sensor embedded in the body; and
wherein the temperature sensor and the plurality of strain sensors comprise one or more optical fiber cables of a single sensor array.

10. A pavement system comprising:
a slab having a body comprising pavement materials presenting a top surface;
a reinforcement layer comprising geogrid materials embedded in the body;
a plurality of strain sensors fixed to the reinforcement layer; and
a processor configured to collect multiple electrical signals across time from each of the plurality of strain sensors and to analyze the electrical signals to determine one or more of: (A) risk of a structural defect in the slab, (B) risk of a problem with underlying subgrade beneath the slab, and (C) movement of passing objects across the top surface;
a temperature sensor embedded in the body; and
wherein the temperature sensor comprises an optical fiber cable surrounded by an air gap encased in a housing.

11. The pavement system according to claim 10, wherein the optical fiber cable enters and exits the housing respectively at entry and exit points, and the length of the optical fiber cable within the housing is at least one percent (1%) greater than a shortest distance between the entry and exit points of the housing.

12. A pavement system comprising:
a slab having a body comprising pavement materials presenting a top surface;
a reinforcement layer comprising geogrid materials embedded in the body;
a plurality of strain sensors fixed to the reinforcement layer; and
a processor configured to collect multiple electrical signals across time from each of the plurality of strain sensors and to analyze the electrical signals to determine one or more of: (A) risk of a structural defect in the slab, (B) risk of a problem with underlying subgrade beneath the slab, and (C) movement of passing objects across the top surface;
a temperature sensor embedded in the body; and
wherein the temperature sensor operates at a scanning rate within ten percent (10%) of scanning rate(s) of the plurality of vehicle-strain sensors.

13. A pavement system comprising:
a slab having a body comprising pavement materials presenting a top surface;
a reinforcement layer comprising geogrid materials embedded in the body;
a plurality of strain sensors fixed to the reinforcement layer;
a processor configured to collect multiple electrical signals across time from each of the plurality of strain sensors and to analyze the electrical signals to determine one or more of: (A) risk of a structural defect in the slab, (B) risk of a problem with underlying subgrade beneath the slab, and (C) movement of passing objects across the top surface; and
an integrity sensor having at least one of a length and a spatial resolution of greater than fifty centimeters (50 cm), the integrity sensor being configured to monitor for structural damage.

14. The pavement system according to claim 13, wherein the integrity sensor operates at a scanning rate of less than two hundred Hertz (200 Hz).

15. A pavement system comprising:
a slab having a body comprising pavement materials presenting a top surface;
a reinforcement layer comprising geogrid materials embedded in the body;
a plurality of strain sensors fixed to the reinforcement layer;
a processor configured to collect multiple electrical signals across time from each of the plurality of strain sensors and to analyze the electrical signals to determine one or more of: (A) risk of a structural defect in the slab, (B) risk of a problem with underlying subgrade beneath the slab, and (C) movement of passing objects across the top surface; and wherein each of the plurality of strain sensors has at least one of a length and a spatial resolution, along a length dimension of the body corresponding to a direction of travel, of equal to or less than fifty centimeters (50 cm).

16. The pavement system according to claim 15, wherein—the length dimension of the body is bisected by a length midpoint, the body has a width perpendicular to the direction of travel and bisected by a width midpoint, the plurality of strain sensors are distributed across the body such that at least thirty percent (30%) of the strain sensors are positioned on a first side of the length midpoint, at least thirty percent (30%) are positioned on a second, opposite side of the length midpoint, at least thirty percent (30%) are positioned on a first side of the width midpoint, and at least thirty percent (30%) are positioned on a second, opposite side of the width midpoint.

17. A pavement system comprising:
a slab having a body comprising pavement materials presenting a top surface;
a reinforcement layer comprising geogrid materials embedded in the body;
a plurality of strain sensors fixed to the reinforcement layer;
a processor configured to collect multiple electrical signals across time from each of the plurality of strain sensors and to analyze the electrical signals to determine one or more of: (A) risk of a structural defect in the slab, (B) risk of a problem with underlying subgrade beneath the slab, and (C) movement of passing objects across the top surface; and
wherein the plurality of strain sensors comprise an optical fiber cable and crossing segments of the optical fiber cable intersect in a plane defined by the top surface of the body, the crossing segments being separated from one another along an axis perpendicular to the plane by a distance of at least two-tenths of an inch (0.2 in.).

18. A pavement system comprising:
a slab having a body comprising pavement materials presenting a top surface;
a reinforcement layer comprising geogrid materials embedded in the body;
a plurality of strain sensors fixed to the reinforcement layer;
a processor configured to collect multiple electrical signals across time from each of the plurality of strain sensors and to analyze the electrical signals to determine one or more of: (A) risk of a structural defect in the slab, (B) risk of a problem with underlying subgrade beneath the slab, and (C) movement of passing objects across the top surface; and
wherein the body has a length along a direction of travel, the plurality of strain sensors being distributed across at least fifty percent (50%) of the length of the body and the plurality of strain sensors being oriented lengthwise substantially parallel to the direction of travel.

\* \* \* \* \*